United States Patent
Thrimawithana et al.

(10) Patent No.: US 11,451,091 B2
(45) Date of Patent: Sep. 20, 2022

(54) CONVERTER

(71) Applicants: Auckland UniServices Limited, Auckland (NZ); Duleepa Jayanath Thrimawithana, Mt Wellington (NZ); Udaya Kumara Madawala, Stonefields (NZ); Gaurav Rajesh Kalra, Mt. Roskill (NZ); Baljit Singh Riar, Royal Oak (NZ); Martin Neuburger, Göppingen (DE); Steven Ian Ruddell, Grafton (NZ); Regan Andrew Zane, Hyde Park, UT (US)

(72) Inventors: Duleepa Jayanath Thrimawithana, Mt Wellington (NZ); Udaya Kumara Madawala, Stonefields (NZ); Gaurav Rajesh Kalra, Mt. Roskill (NZ); Baljit Singh Riar, Royal Oak (NZ); Martin Neuburger, Göppingen (DE); Steven Ian Ruddell, Grafton (NZ); Regan Andrew Zane, Hyde Park, UT (US)

(73) Assignee: Auckland UniServices Limited, Auckland (NZ)

(*) Notice: Subject to any disclaimer, the term of this patent is extended or adjusted under 35 U.S.C. 154(b) by 116 days.

(21) Appl. No.: 16/498,535

(22) PCT Filed: Mar. 28, 2018

(86) PCT No.: PCT/NZ2018/050039
§ 371 (c)(1),
(2) Date: Sep. 27, 2019

(87) PCT Pub. No.: WO2018/182432
PCT Pub. Date: Oct. 4, 2018

(65) Prior Publication Data
US 2020/0106303 A1    Apr. 2, 2020

(30) Foreign Application Priority Data

Mar. 28, 2017 (NZ) .................................. 730582

(51) Int. Cl.
*H02J 50/05* (2016.01)
*H02J 50/12* (2016.01)
(Continued)

(52) U.S. Cl.
CPC .............. *H02J 50/12* (2016.02); *H02J 7/025* (2013.01); *H02J 50/05* (2016.02); *B60L 50/64* (2019.02); *B60L 53/12* (2019.02); *B60L 53/22* (2019.02)

(58) Field of Classification Search
USPC ....................................................... 307/104
See application file for complete search history.

(56) References Cited

U.S. PATENT DOCUMENTS 9,843,086 B1 * 12/2017 Chenakin ................. H03B 5/30
2008/0013351 A1 * 1/2008 Alexander .......... H02M 7/4807
363/123

(Continued)

FOREIGN PATENT DOCUMENTS

WO    WO-2017/138821 A1    8/2017
WO    WO-2018182432 A1    10/2018

OTHER PUBLICATIONS

"International Application No. PCT/NZ2018/050039, International Preliminary Report on Patentability dated Oct. 1, 2019", 6 pgs.

(Continued)

*Primary Examiner* — Toan T Vu
*Assistant Examiner* — Xuan Ly
(74) *Attorney, Agent, or Firm* — Piloff Passino & Cosenza LLP; Martin J. Cosenza

(57) ABSTRACT

A converter including a bridge circuit having a first leg and a second leg, each leg including a high switch and a low (Continued)

switch, the high switches being connected to a first energy source and the low switches being connected to ground, a coupling network(s) having a first connection between the switches of the first leg and a second connection between the switches of the second leg, and a second (or multiple secondary) energy source(s) connected between the coupling network(s) and ground, wherein the coupling network comprises a first inductive element connected between the second energy source and the switches of the first leg, and a second inductive element connected between the second energy source and the switches of the second leg.

25 Claims, 22 Drawing Sheets

(51) Int. Cl.
  *H02J 7/02* (2016.01)
  *B60L 53/12* (2019.01)
  *B60L 53/22* (2019.01)
  *B60L 50/64* (2019.01)

(56) References Cited

U.S. PATENT DOCUMENTS

| | | | | |
|---|---|---|---|---|
| 2010/0270998 | A1* | 10/2010 | Caubert | H02M 7/53871 323/312 |
| 2013/0207482 | A1* | 8/2013 | Madawala | H02J 7/025 307/104 |
| 2015/0001927 | A1* | 1/2015 | Han | B60L 58/27 307/10.7 |
| 2015/0049518 | A1* | 2/2015 | Harrison | H02M 7/4807 363/17 |
| 2015/0162840 | A1* | 6/2015 | Frost | H02M 3/33569 363/17 |
| 2016/0094141 | A1* | 3/2016 | Petkov | H02M 5/225 323/205 |
| 2017/0240055 | A1* | 8/2017 | Nguyen | H02J 50/12 |
| 2018/0375465 | A1* | 12/2018 | Ayyanar | H02J 3/38 |

OTHER PUBLICATIONS

"International Application No. PCT/NZ2018/050039, International Search Report and Written Opinion dated Aug. 1, 2018", (Aug. 1, 2018), 10 pgs.

Covic, Grant Anthony, et al., "Modern Trends in Inductive Power Transfer for Transportation Applications", IEEE Journal of Emerging and Selected Topics in Power Electronics, vol. 1, No. 1, Mar. 2013, (Mar. 2013), 28-41.

Dutta, Sumit, "Controls and Applications of the Dual Active Bridge DC to DC Converter for Solid State Transformer Applications and Integration of Multiple Renewable Energy Sources", PhD thesis, Department of Electrical Engineering, North Carolina State University, USA, 2014, available on the Internet at https://repository.lib.ncsu.edu/handle/1840.16/9710 [retrieved Sep. 26, 2019], (2014), 201 pgs.

Qin, Hengsi, et al., "Ac-Ac Dual Active Bridge Converter for Solid State Transformer", 2009 IEEE Energy Conversion Congress and Exposition, IEEE, 2009, (2009), 3039-3044.

Walbermark, M. Dos Santos, et al., "DC microgrids with photovoltaic generation and high frequency isolation connected to utility grid", 2013 Brazilian Power Electronics Conference, IEEE, Oct. 27-31, 2013 [abstract only], (Apr. 10, 2014), 636-641.

* cited by examiner

CONVERTER

PRIORITY CLAIM TO RELATED APPLICATIONS

This application is a U.S. national stage filing under 35 U.S.C. § 371 from International Application No. PCT/NZ2018/050039, filed on 28 Mar. 2018, and published as WO2018/182432 on 4 Oct. 2018, which claims the benefit under 35 U.S.C. 119 to New Zealand Application No. 730582, filed on 28 Mar. 2017, the benefit of priority of each of which is claimed herein, and which applications and publication are hereby incorporated herein by reference in their entirety.

BACKGROUND

As the uptake of battery powered devices continues to grow around the world, effective charging techniques, which are safe, reliable and convenient, have become a major point of discussion. Traditionally, conductive charging techniques (hard-wired chargers, where a physical connection between a battery and an external energy source, most likely the utility grid) have been used, however these techniques are inconvenient for users, and often raise concerns over user safety and reliability, especially at higher power levels and during harsh weather conditions. Consequently, there has been a shift towards wireless chargers, which are inherently safer, more convenient and lack any physical contacts. Inductive Power Transfer (IPT), which has been used in a wide variety of applications, including powering automated guided vehicles (AGV); materials handling; charging of portable electronic devices and powering biomedical devices and Electric Vehicle (EV) charging, is currently the preferred technology for implementing wireless chargers. This preference is mainly due to the high galvanic isolation and flexibility offered by IPT based wireless chargers while still being able to achieve efficiencies comparable to wired chargers.

The current uptake in IPT charging is highlighted by the introduction of specifications, standards and guidelines for IPT based chargers, which intends to ensure interoperability between various systems. For example, portable communication or computing devices may require multiple different plug arrangement. Another example of particular relevance is electric vehicle (EV) charging in which wire charging techniques suffer from reliability and safety issues at high power levels. To minimise safety concerns for EV's, minimal user input is preferred to initiate the charging process therefore there has been a shift towards wireless charging techniques. Standards such as SAE J2954, provides specification guidelines on the implementation of wireless chargers for EV's. SAE J2954 specifies wireless charging through inductive power transfer (IPT), which is currently the preferred technology for wireless power applications.

IPT systems are capable of transferring very high levels of power through a safe and reliable inductive link. This has led to numerous industrial applications in the past 20 years including factory automation, clean room applications and monorail systems. Furthermore, the inherent safety provided by this technology has also led to many biomedical applications, see for example, G. A. Covic and J. T. Boys, "Modern Trends in Inductive Power Transfer for Transportation Applications," IEEE Journal of Emerging and Selected Topics in Power Electronics, vol. 1, pp. 28-41, 2013.

The majority of IPT based EV chargers reported to date only allow unidirectional power flow, typically from the utility grid to the EV battery. However, the recent introduction of bidirectional IPT (BD-IPT) technologies not only improves system efficiency and flexibility, but also enables Vehicle to Grid/Grid to Vehicle (V2G/G2V) services. These services, which are expected to become an integral part of future EV charging infrastructure, include the absorption of power variances produced by renewable energy sources, reactive power injection for grid voltage regulation and harmonics absorption for improved power quality. Overall, such services can further enhance the use of renewable energy sources, while also providing an additional revenue stream for EV owners.

Wide-bandgap devices, such as silicon-carbide or gallium-nitride devices, provide the possibility to operate IPT systems at higher frequencies and higher voltages. Furthermore, wide bandgap devices have much lower on state resistances and negligible reverse recovery losses when compared to silicon devices. Thus, IPT systems can benefit from improved power density and efficiency with these devices. More specifically, operating at higher voltages will allow for lowered current in magnetic couplers, hence reducing resistive losses and unwanted heating effects. A higher driving voltage also opens up opportunities to drive multiple series connected couplers or even elongated tracks, which will be beneficial in high power applications such as fast charging and in-motion charging. Existing IPT systems, which utilise conventional switch-mode power converters, lack the capability to utilise wide bandgap devices to their full voltage rating.

This limitation can be mainly attributed to limited supply and output voltages found in typical applications. Increasing the operating voltage of these systems can be a simple, yet expensive solution. For example, additional power converters can be used to boost/buck supply/load voltages, however an increased component count and reduced efficiency lead to an undesired solution.

SUMMARY

An exemplary embodiment includes:
A converter comprising:
a bridge circuit having a first leg and a second leg, each leg including a high switch and a low switch, the high switches being connected to a first energy source and the low switches being connected to ground;
a coupling network(s) having a first connection between the switches of the first leg and a second connection between the switches of the second leg; and
a second (or multiple secondary) energy source(s) connected between the coupling network(s) and ground, wherein
the coupling network may comprise a first inductive element connected between the second energy source and the switches of the first leg, and a second inductive element connected between the second energy source and the switches of the second leg.

Another exemplary embodiment includes:
A converter comprising:
a bridge circuit having a first leg and a second leg, each leg including a high switch and a low switch, the high switches being connected to a first energy source and the low switches being connected to ground;
a coupling network(s) having a first connection between the switches of the first leg and a second connection between the switches of the second leg; and a second (or multiple secondary) energy source(s) connected between the coupling network(s) and ground, wherein:

the converter is a boost active bridge converter that includes a capacitor, the capacitor being the first energy source; and the converter includes a DC energy source having a positive terminal electrically located between the first leg and the second leg, wherein the DC energy source is the second energy source.

Another embodiment includes:

A converter comprising:

a bridge circuit having a first leg and a second leg, each leg including a high switch and a low switch, the high switches being connected to a first energy source and the low switches being connected to ground;

a coupling network(s) having a first connection between the switches of the first leg and a second connection between the switches of the second leg; and a second (or multiple secondary) energy source(s) connected between the coupling network(s) and ground, wherein the converter is controlled so that there is a difference in DC voltage on the first leg relative to the second leg, wherein the first leg in combination with the second leg converts AC power to DC power or visa-versa.

The first energy source may comprise a capacitor. A separate energy source, for example a capacitor may be provided connected between each high switch and ground.

A third energy source may be connected in parallel with the coupling network (directly or through another coupling network). The third energy source may comprise an AC energy source.

The coupling network comprises one or more inductors (or capacitors) arranged to interface the second (or third) energy source effectively with the first and second legs.

The coupling network may comprise a first inductive element connected between the second energy source and the switches of the first leg, and a second inductive element connected between the second energy source and the switches of the second leg. The first and second inductive elements may be coupled. A third inductive element may be connected between the first and second inductive elements and the second energy source.

A controller is provided to control the switches of the boost active bridge. The controller is also configured to control the duty cycle and/or phase of the switches. The controller may have one or more input control variables as inputs for controlling the switches. Control of the duty cycle of the switches can control two output variables of the converter. The two output parameters can comprise the voltage of each first energy source and the magnitude of the fundamental voltage across the third energy source.

Alternatively, the controller may control the energy transfer between each source to optimise the operation (efficiency and power transfer) of the converter.

The controller may control the duty cycle of the legs symmetrically.

In another aspect the invention may broadly be said to consist in a dual bridge converter comprising two converters according to the preceding statement wherein the AC energy sources are coupled to each other.

In one example the coupled AC energy sources provide isolation.

In one example the AC sources are loosely coupled. The loose coupling allows inductive power transfer between the converters.

In another aspect the invention broadly provides an IPT converter comprising:

a bridge circuit having a first leg and a second leg, each leg including a high switch and a low switch, the high switches being connected to a first energy source and the low switches being connected to ground, a coupling network(s) having a first connection between the switches of the first leg and a second connection between the switches of the second leg, a second energy source connected between the coupling network and ground (directly or through a another coupling network), and a magnetic coupler connected in parallel with the coupling network(s).

The first energy source may comprise a capacitor. A separate energy source, for example, a capacitor may be provided connected between each high switch and ground.

The magnetic coupler includes a coil which may be series or parallel tuned. The magnetic coupler may comprise a primary apparatus or a secondary (pick-up) apparatus, or may be configured for bi-directional power transfer.

In another aspect the invention broadly provides an IPT system comprising at least one converter according to the preceding statement.

In another aspect the invention broadly provides a method of controlling a boost active bridge converter, the method comprising the steps of:

controlling the bridge switches to alternately apply current from a first energy source to a coupling network which couples the converter to a second energy source, and controlling the duty cycle of the or selected bridge switches to control the voltage across a third energy source connected in parallel with the coupling network.

The energy flow between first, second and third energy sources can be bi-directional.

The concept can be extended with multiple legs, for example to supply a three-phase system.

In another aspect the invention broadly provides a converter comprising:

an H bridge having a DC side and an AC side, a first energy source connected to the DC side, a coupling network connected to the AC side, and a second energy source connected to the coupling network.

In one example the coupled AC energy sources provide isolation.

In one example the AC sources are loosely coupled. The loose coupling allows inductive power transfer between the converters.

Additionally, if the secondary converter is capable of bidirectional power flow, the grid current can also be controlled to deliver power to the grid.

In another aspect the invention broadly provides an IPT system (50) comprising at least one converter according to the preceding statement.

This functionality enables Vehicle to Grid (V2G) services such as, voltage/frequency regulation, and reactive power/harmonics compensation.

As used herein the term "and/or" means "and" or "or", or both.

As used herein "(5)" following a noun means the plural and/or singular forms of the noun.

The term "comprising" as used in this specification means "consisting at least in part of". When interpreting statements in this specification which include that term, the features, prefaced by that term in each statement, all need to be present, but other features can also be present. Related terms such as "comprise" and "comprised" are to be interpreted in the same manner.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7).

The entire disclosures of all applications, patents and publications, cited above and below, if any, are hereby incorporated by reference.

The disclosed subject matter also provides method or system which may broadly be said to consist in the parts, elements and features referred to or indicated in this specification, individually or collectively, in any or all combinations of two or more of those parts, elements or features. Where specific integers are mentioned in this specification which have known equivalents in the art to which the invention relates, such known equivalents are deemed to be incorporated in the specification.

Other aspects of the invention may become apparent from the following description which is given by way of example only and with reference to the accompanying drawings.

DRAWING DESCRIPTION

A number of examples of the invention will now be described by way of example with reference to the drawings as follows.

DETAILED DESCRIPTION OF THE DRAWINGS

Over the last decade, a number of bi-directional inductive power transfer systems (BD-IPT) that are suitable for wireless grid integration of electric vehicles (EVs) have been developed. These developments have been fueled by the enhanced efficiency and spatial tolerance offered by BD-IPT systems, while also enabling the provision of Vehicle-to-Grid (V2G) services. A typical BD-IPT system utilises two synchronised full-bridge converters to drive the primary and secondary magnetic couplers, thus enabling bi-directional power transfer. These full-bridge converters are often operated at fixed-duty cycles to minimize switching losses as well as the generation of harmonics. Additional pre/post power regulation stages are therefore employed to cater for a wide range of loading conditions, at the expense of cost and power density. As an alternative solution, the present invention proposes a novel power converter, named a Boost Active Bridge (BAB), to replace the full-bridge converters.

According to an example of the present invention, the BAB topology provides a converter circuit topology and method to integrate or control additional AC/DC energy sources to the AC-side of an active full bridge. This is achieved at least in part by including an inductor topology which couples additional DC/AC energy sources to the AC side of the active bridge. The inductor topology may comprise uncoupled, partially coupled, or fully coupled inductors, which act to reduce circulating currents and reduce physical size of components.

A split DC-link is used to allow each inverter leg to operate at a slightly different DC voltage, allowing mismatched duty cycles and simplifying control. The split DC-link is provided by using a separate capacitor for each leg of the bridge. The regulation techniques, described below, allow for two power dependent variables to be adjusted with just one control input. This results in more efficient operation when power regulation is required.

The converter and methods herein described can be used in a number of different applications, including but not limited to the following technologies:

Wireless dynamic electric vehicle charging.
Wireless/wired stationary electric vehicle charging.

Grid connected bi-directional inductive power transfer systems used in vehicle to grid (V2G)/grid to vehicle (G2V) applications.

Fuel cell or Photovoltaic isolated grid connection.

Figure 1:
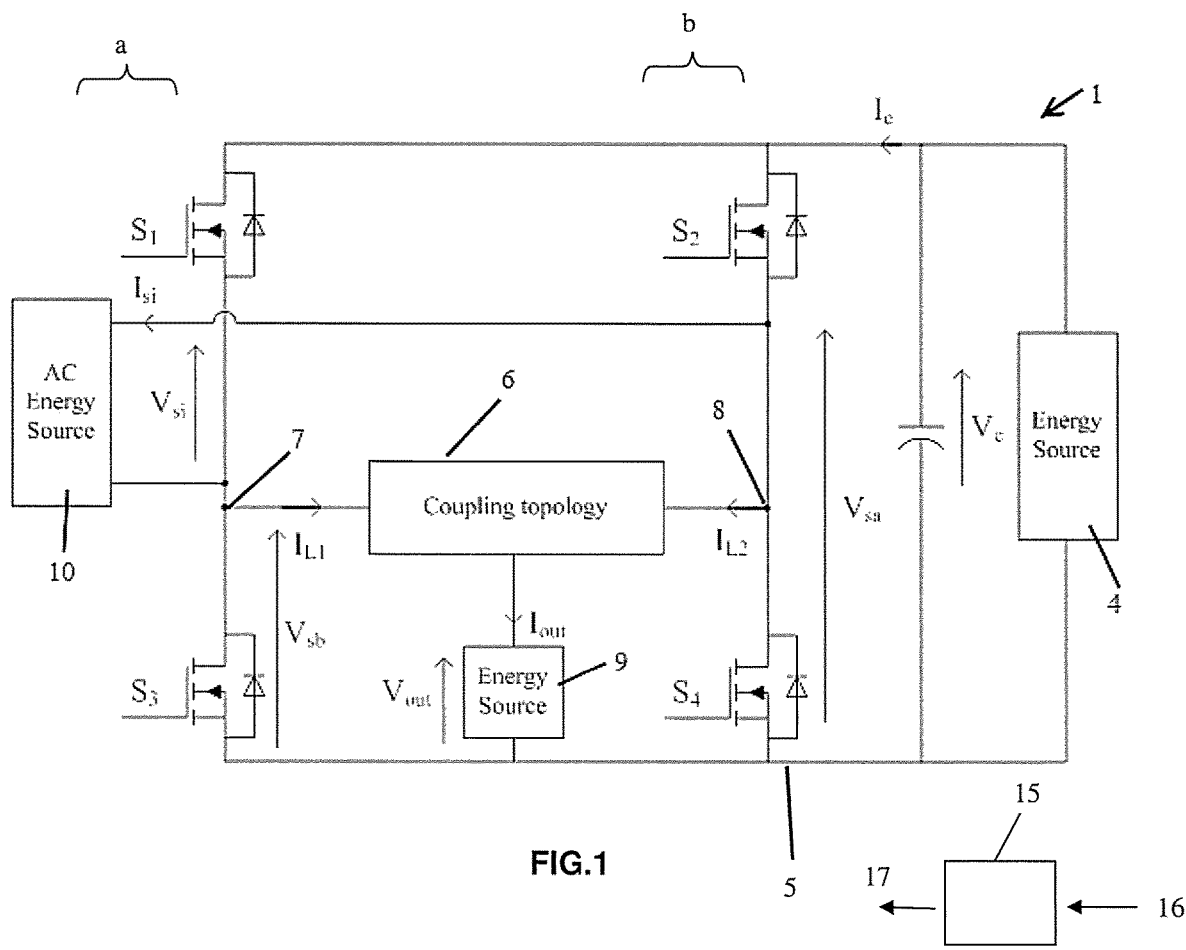
FIG. 1 is a circuit diagram showing the topology of a converter of the present invention, referred to in this document as a boost active bridge (BAB) converter.

The converter of the present invention is referred to in this document as a "Boost Active Bridge" or BAB converter. It provides an inexpensive solution which is capable of fully utilising the voltage rating of wide bandgap devices, when the supply/output voltage is significantly less than the device ratings. A system diagram of a BAB, which can act as a DC to AC converter with an integrated boost stage, is shown in FIG. 1. As evident from this diagram, a BAB enables the integration of multiple energy sources with different voltage ratings.

Referring to FIG. 1, a BAB converter is shown, generally referenced 1. The converter comprises an active bridge in the form of an H-bridge having a first leg a and a second leg b. Each leg has two switches. A high switch S1 on leg a and another high switch S2 on leg b, and a low switch S3 on leg a and another low switch S4 on leg b. The low switches S3 and S4 are connected to ground 5, and the high switches S1 and S2 are connected to a first energy source comprising energy source 4 and/or capacitor Vc. The first energy source is connected between the high switches and ground. As will be described below, this may simply be a capacitor, and may comprise a separate capacitor for each high switch i.e. a separate capacitor in parallel with each leg. It should be noted that, although the example shown in FIG. 1 shows a converter with 2 legs, the concept discussed can be applied to a converter with multiple legs, for example a three-phase converter.

A coupling network 6 has a first connection 7 between the switches S1 and S3 of the first leg and a second connection 8 between the switches S2 and S4 of the second leg. A second energy source 9 is connected to the coupling network, being between the coupling network 6 and ground 5.

A third energy source 10, being an AC energy source, is connected to connection points 7 and 8 i.e. in parallel with the coupling network 6.

A controller 15 comprising a control circuit receives one or more input control variables 16 and has outputs 17 to control switches S1-S4 to achieve control of one or more output variables of the converter, for example control of Vout or Iout. Controller 15 switches S1 and S3 in a complementary fashion, therefore for example when S1 is ON, then S2 OFF. Switches S2 and S4 are also operated similarly in a complementary fashion. The ON time of S1 and S3 are controlled together with the time-shift (phase-shift) between the control signals applied to each leg to regulate the power flow between each source. As an example when switches S1 and S4 are ON then switches S2 and S3 are OFF so that the voltages at points 7 and 8 are out of phase. For convenience this is referred to in the following description as driving the legs a and b out of phase with each other.

Another way of describing the BAB 1 arrangement is a first energy source connected to the DC side of the H-bridge and a second energy source in parallel with a coupling network connected to the AC side of the H-bridge.

Figure 2:
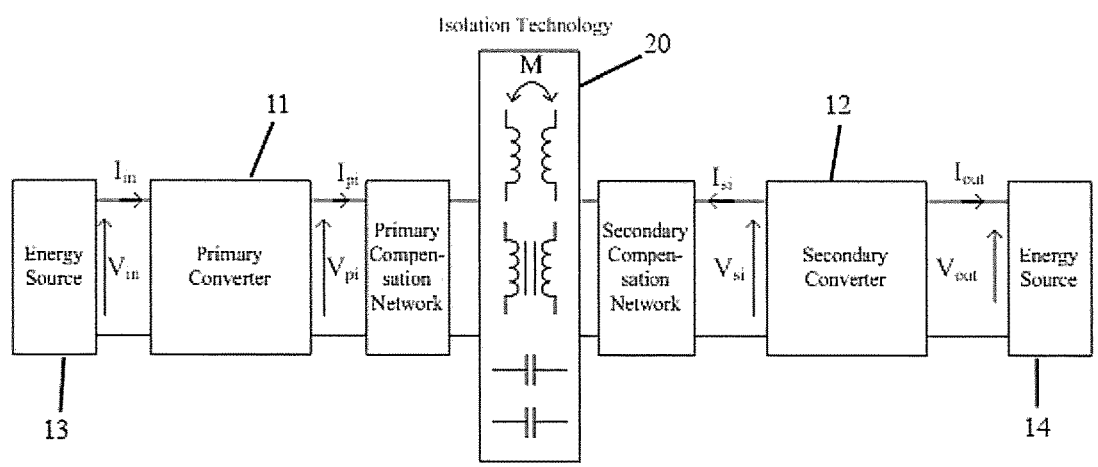
FIG. 2 is a general circuit diagram showing the integration of two different energy sources.

The operation of a BAB is discussed below with reference to its applications in IPT systems. However it should be noted that the proposed topology is not limited to this application and can be applied in conventional power converters. FIG. 2 illustrates a general application of the proposed technology. Referring to FIG. 2, one or more BAB converters are used to facilitate the integration of multiple energy sources through an isolation technology 20, such inductive power transfer (IPT), capacitive power transfer (CPT) a transformer. The BAB can be used as the primary converter 11, secondary converter 12 or as both. The isolation technology 20 effectively couples the AC energy source 10 from a BAB converter to the AC side of a conventional converter or another BAB converter. Utilising the BAB as both the primary and secondary converter enables bi-directional power flow in which case the isolation technology 20 effectively couples the BAB converters so that each converter comprises the energy source 10 of the other AC energy sources 10 of each BAB converter. A bi-directional configuration can be known as a dual BAB or a DBAB. A BAB in primary/secondary together with a traditional active bridge (AB) in the secondary/primary can also be used to transfer bi-directional power in some applications. The energy sources 13 and 14 may include, but are not limited to, renewable energy sources, battery storage, fuel cell, utility grid etc. Isolation technologies may include, but are not limited to inductive power transfer, capacitive power transfer, high and low frequency transformers etc. For the BAB converters used in the arrangement shown in FIG. 2, the energy sources 13 and/or 14 will comprise the energy source 9 shown in FIG. 1.

Some more specific examples of the proposed BAB converter topology will now be described below.

Example #1: IPT Technology Based EV Charger

The following example applies the BAB in an IPT technology based EV charger, nonetheless the operating principles discussed are relevant for any of the aforementioned applications.

Figure 3:
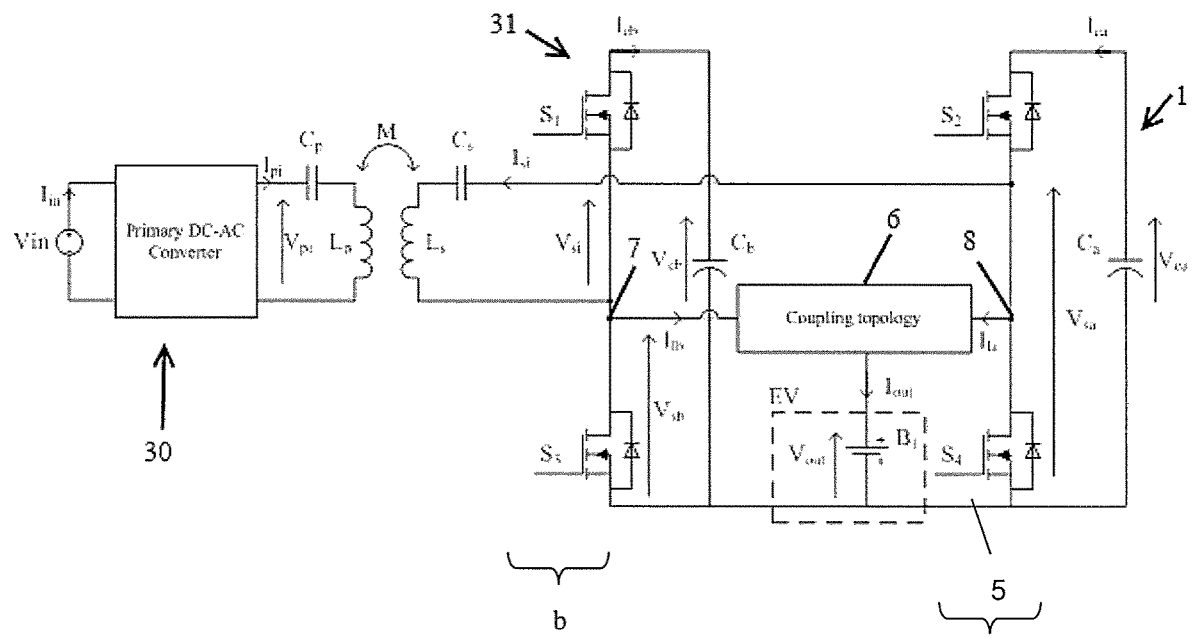
FIG. 3 is a circuit diagram of an IPT technology based EV charger utilising a converter (BAB) of the present invention.

This example is shown in FIG. 3, where an IPT primary circuit is shown generally referenced 30 which energises a primary magnetic coupler Lp to supply power inductively to a secondary circuit 31 which includes a BAB converter 1. The BAB simultaneously boosts the EV battery B1 voltage, and applies a high frequency voltage across the secondary magnetic coupler Ls. To achieve this, both inverter legs a and b are operated nominally at 50% duty cycle and 180 degrees out of phase with each other. In a practical system it is improbable that both inverter legs operate at an identical duty cycle, hence resulting in circulating DC current through the coupling topology. To counteract this, the DC side capacitor is split into two independent capacitors Ca and Cb, one for each inverter leg a,b. This will provide an energy source that allows each inverter leg to operate at a slightly different DC voltage, thus ensuring that the average value of $V_{sa}$ and $V_{sb}$ are equal.

Figure 4:
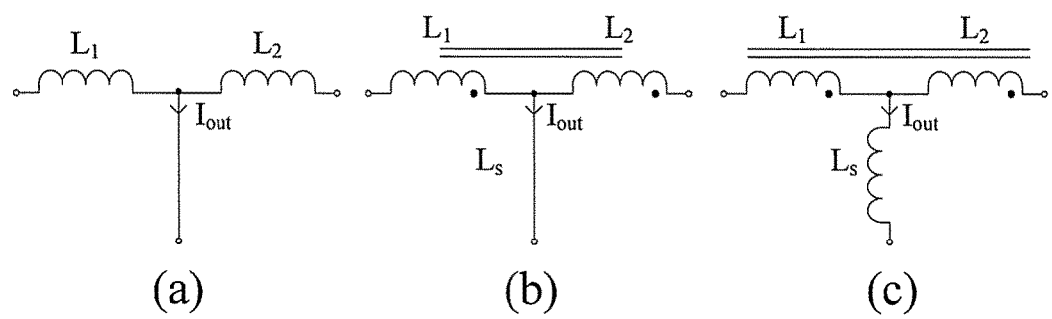
FIG. 4 shows examples of different coupling topologies that can be used with a converter of the present invention, for example, (a) decoupled inductors, (b) partially coupled inductors, and (c) tightly coupled inductors.

There are three different coupling topologies that can be used to provide the coupling network 6. The coupling network 6 connects the EV battery ($B_1$) to the BAB, as shown in FIG. 4. Topology 4(a) consists of two decoupled inductors L1 and L2, however a coupled inductor, or coupled inductors, is advantageous as it can reduce the current ripple or reduce the amount of inductance required.

Topology 4(b) consists of a loosely coupled inductor L1/L2, this allows for energy to be stored in the leakage inductance.

Contrastingly, topology 4(c) consists of a tightly coupled inductor L1/L2, here an external inductor L3 is required for energy storage.

Since the two nodes 7 and 8 connecting the coupling network 6 to the BAB are driven 180 degrees out of phase, the current ripple through each node is also 180 degrees out of phase.

This results in almost zero current ripple seen by $B_1$. $B_1$ and $C_a$ are connected through the coupling network and one inverter leg (54, referred to for convenience as 5a), this can also be seen as an interconnection through a boost converter. Similarly, $B_1$ is connected to $C_b$ through the coupling network.

$$V_{ca/cb} = \frac{V_{out}}{D_{sa/sb}} \quad (1)$$

$$P_{out} = \frac{8V_{in}V_{out}}{D_{sa/sb}\omega_T M \pi^2} \sin\left(\frac{\varphi_1}{2}\right)\sin(\pi D_{sa/sb}) \quad (2)$$

Equation 1, where $D_{sa/sb}$ represents the duty cycle of inverter leg "a" and leg "b", respectively, can be used to determine the voltage ratio between the EV battery voltage ($V_{out}$) and $V_{ca/cb}$ 5b in FIG. 3 is represented by 53. Clearly, a nominal duty cycle of 50% results in double the EV battery voltage applied across each inverter leg capacitor. Moreover, this results in double the voltage across the secondary compensation network shown in FIG. 2. Assuming an active bridge is the primary converter in FIG. 2, the power transfer can be calculated using Equation 2. In a series-series IPT system (i.e. the magnetic couplers are series compensated such that Cp is in series with Lp and Cs is in series with Ls), such as this example, the output power is inversely proportional to mutual inductance in between Lp and Ls. This implies that, when misalignment between the primary and secondary magnetic couplers occurs, more than nominal power is transferred, and hence regulation is required.

Figure 5:
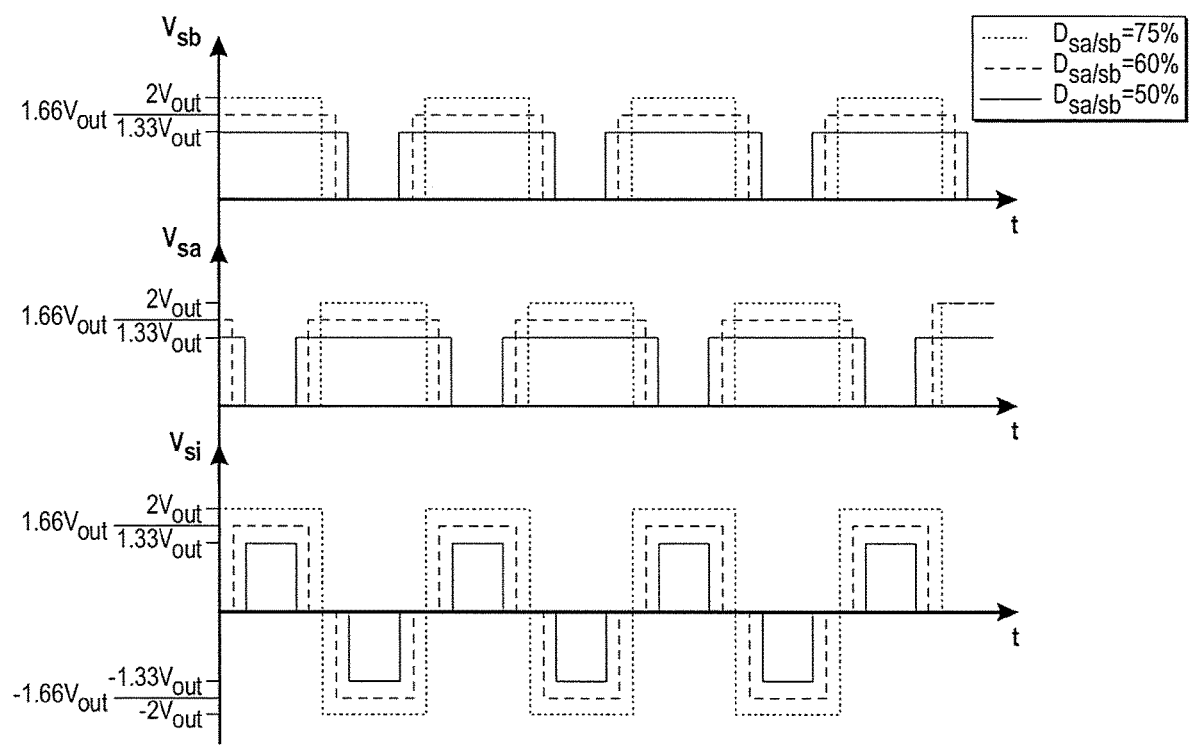
FIGS. 5 to 5E show voltage waveforms produced by the converter (BAB) of the present invention.
Figure 5A:
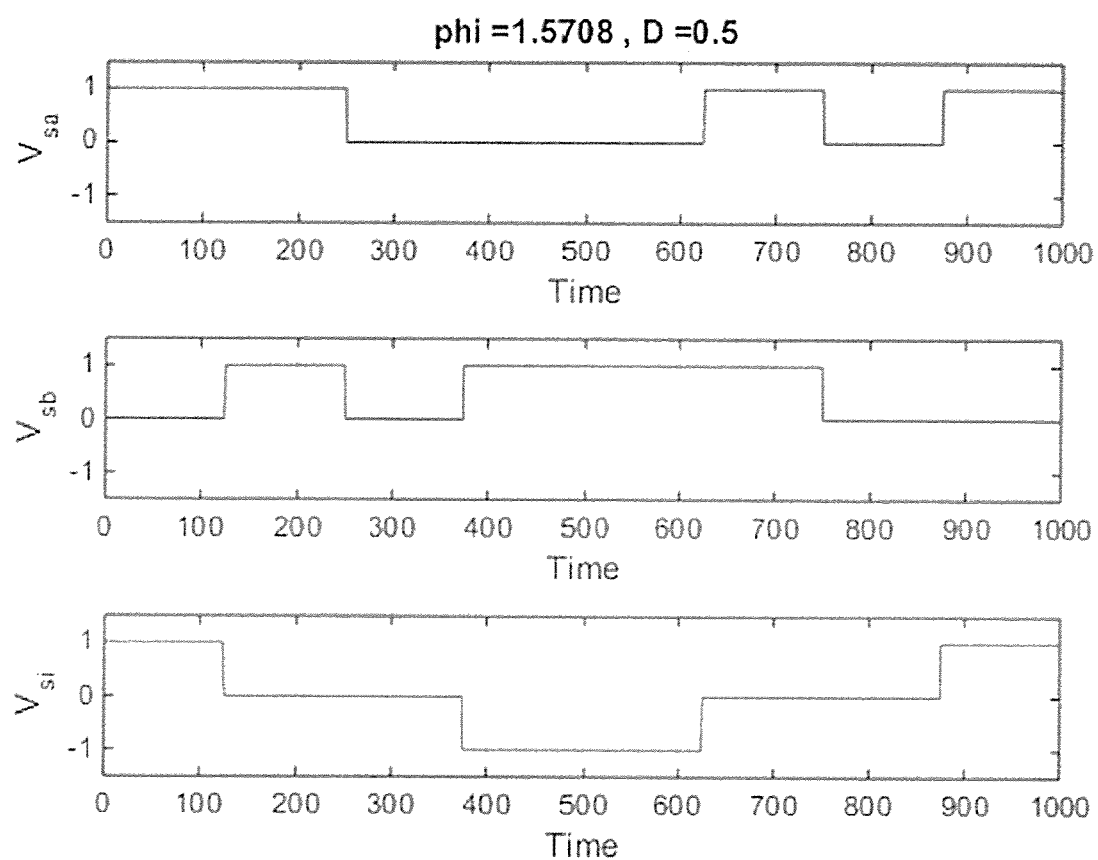
Figure 5B:
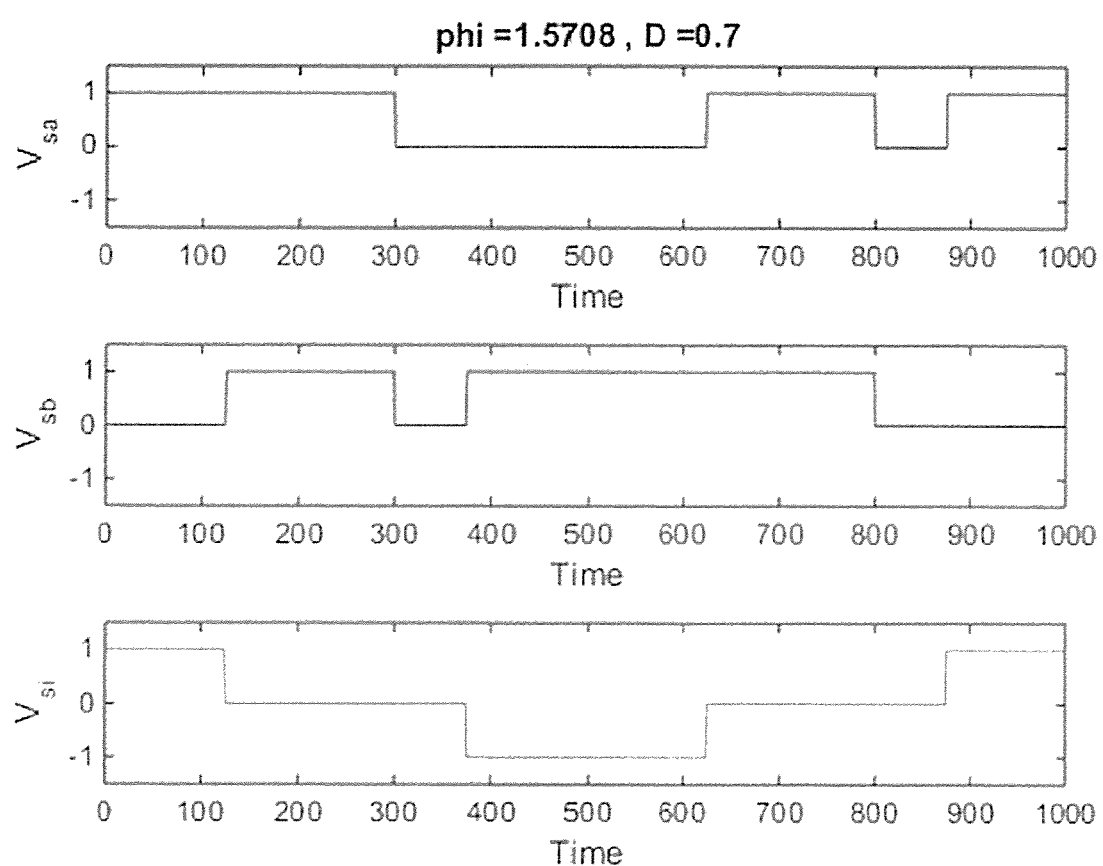
Figure 5C:
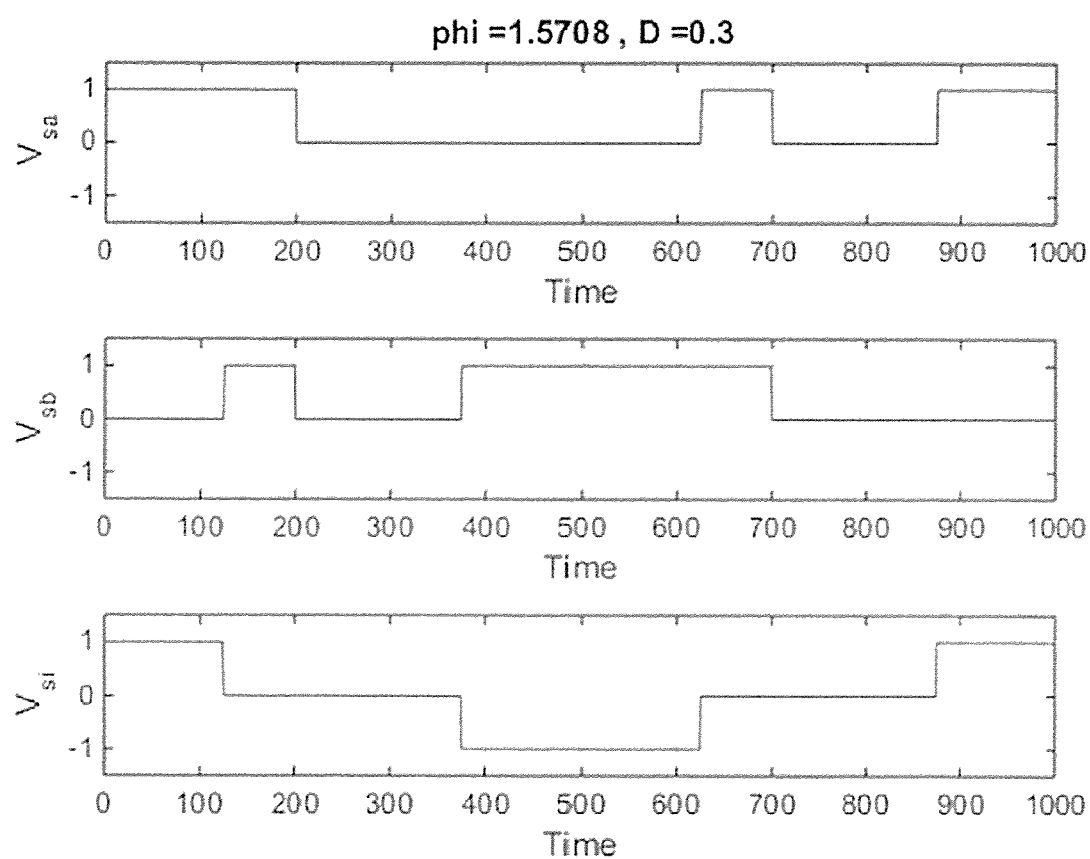
Figure 5D:
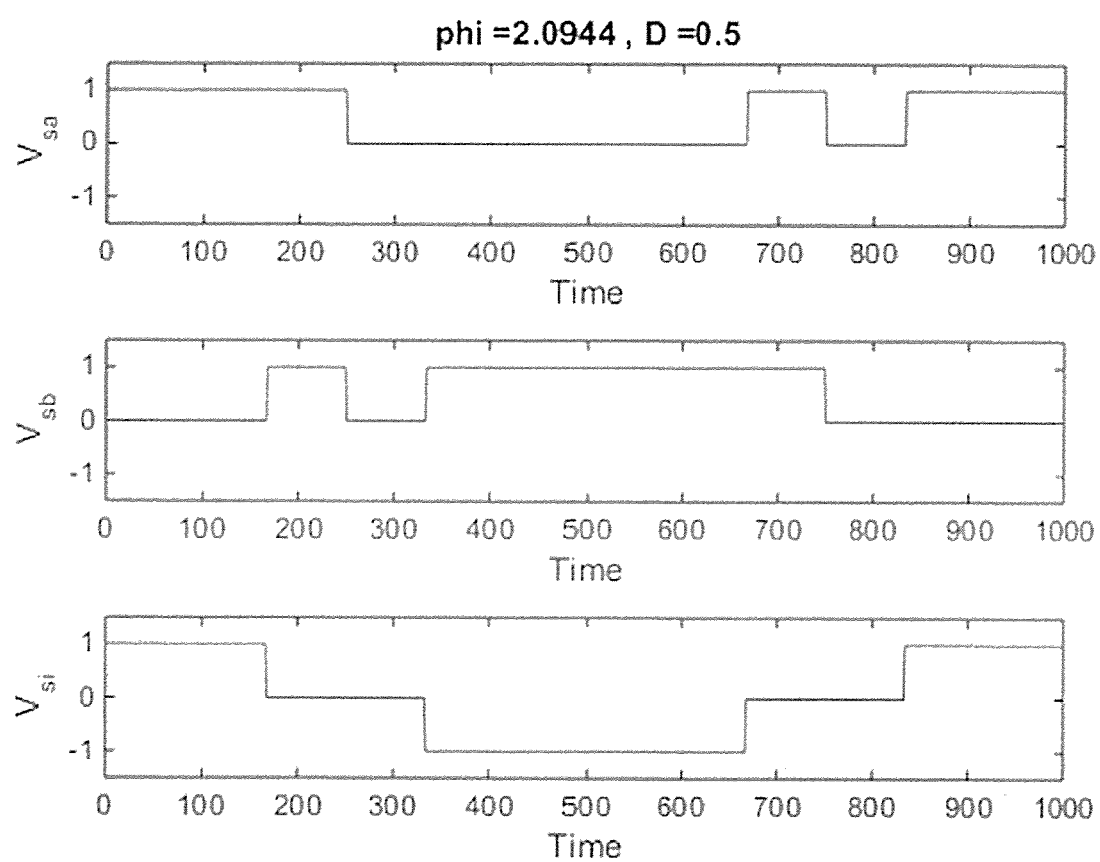
Figure 5E:
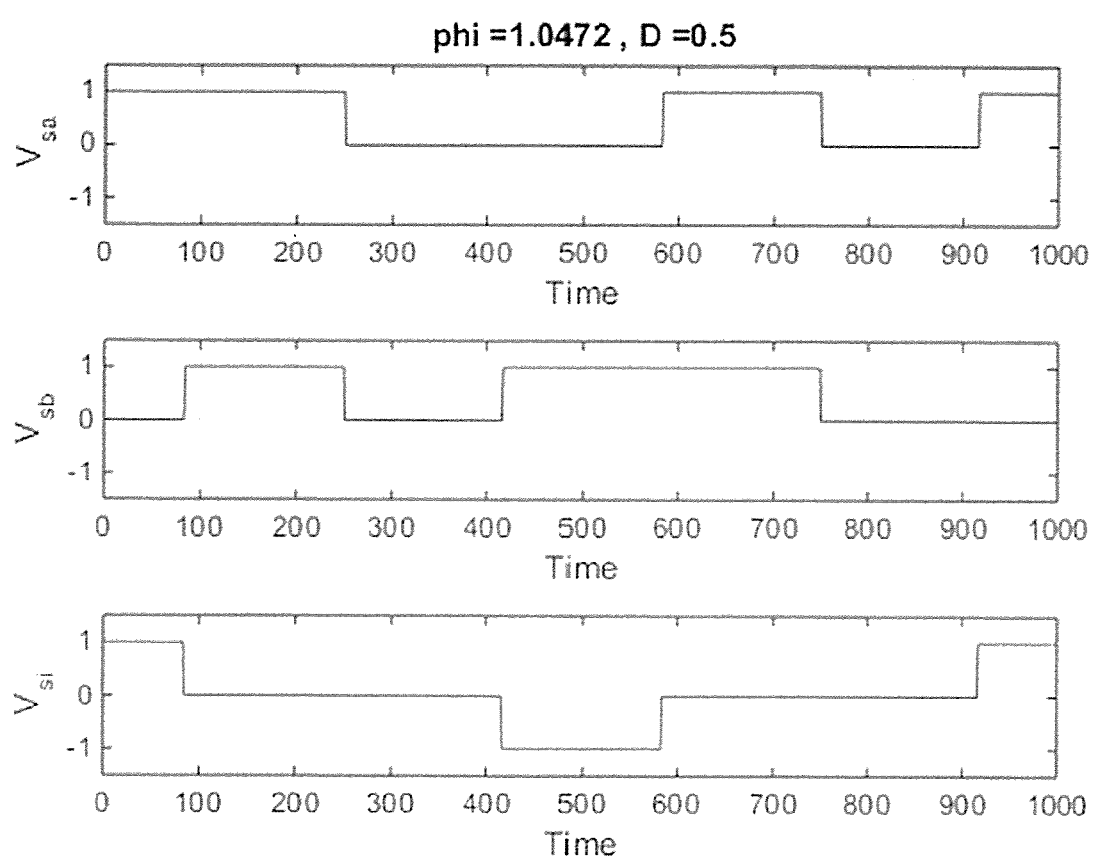

Conventionally, power is regulated by controlling the amplitude of the fundamental voltage applied across the secondary compensation network. However, in the case of the BAB, by symmetrically increasing the duty cycle of both inverter legs, the DC voltage on each inverter leg and the magnitude of the fundamental voltage applied across the secondary compensation network ($V_{si}$) can be reduced. Controlling both these variables with just one control input is more efficient, as a smaller change in duty cycle will result in larger reduction in power. This characteristic is illustrated by FIG. 5, which displays voltage waveforms for three different duty cycles.

FIGS. 5a-5e show other alternative modulation techniques which may be used. In these figures the relevant voltages shown in FIG. 5 are not illustrated. However, the switching patterns which result in a combined duty cycle for each of SA and SB are illustrated, along with the resultant output VSI.

Experimental Results

Figure 6:
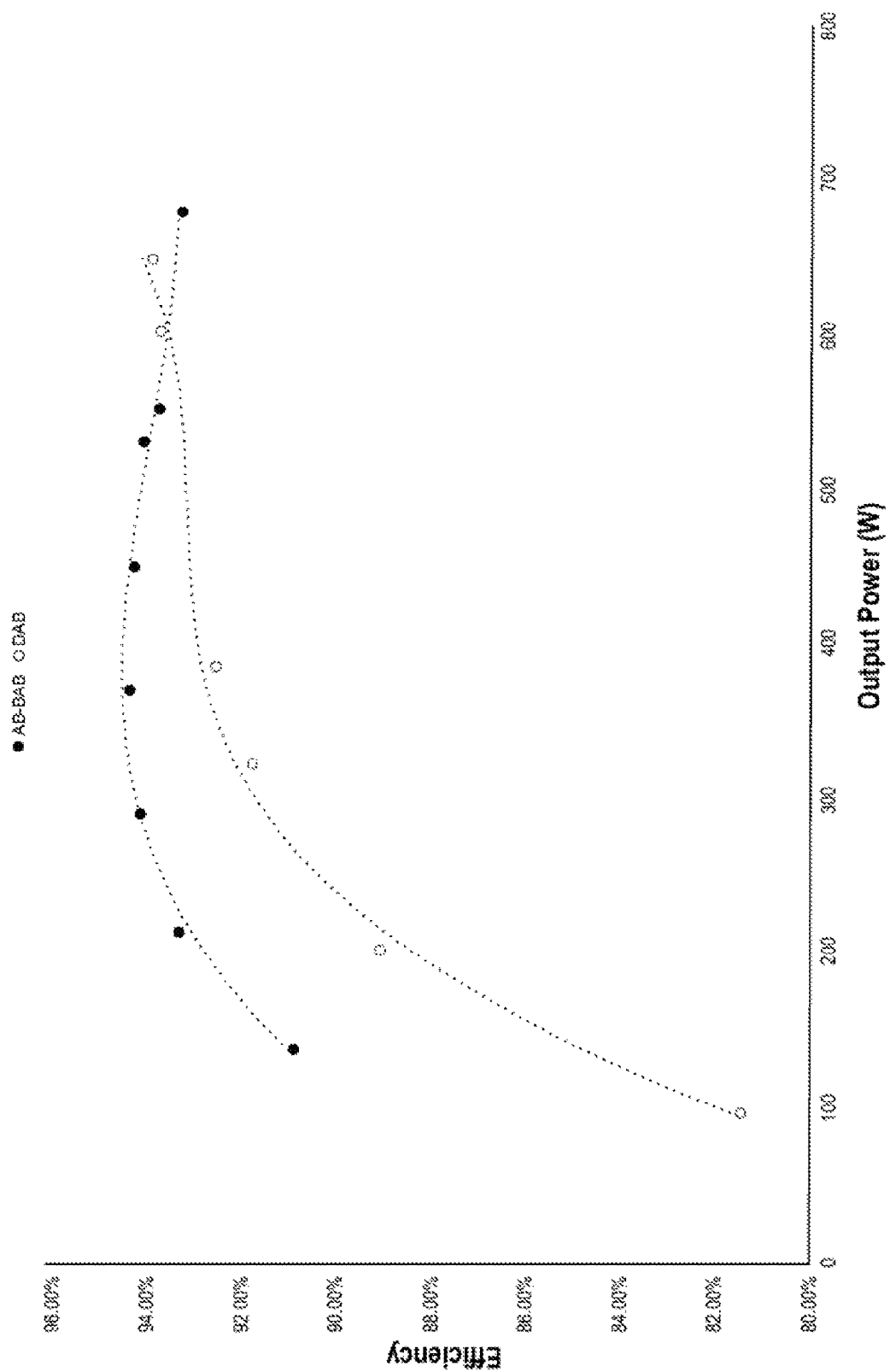
FIG. 6 is a graph showing Efficiency vs. % regulation for both an active bridge primary to a boost active bridge secondary AB-BAB and a traditional dual active bridge (DAB) configurations.

As discussed above with reference to FIG. 3, an active bridge primary and boost active bridge secondary configuration (AB-BAB) should regulate the output power more efficiently when compared to a standard IPT system employing conventional switch-mode converters. This was verified experimentally using the test set ups specified in Table I and Table II. In the case of the conventional system, which employed active bridges in primary and pick-up, power was regulated by driving each inverter leg on the secondary side at a constant 50% duty cycle and modulating the phase angle between them. The AB-BAB utilised the aforementioned regulation technique. Efficiency data was obtained for each configuration at varying levels of regulation. The data recorded using a Yokogawa WT1800 power analyser is shown below in FIG. 6. It is clear that when output power is regulated to below rated power the AB-BAB configuration is superior in terms of efficiency. Moreover, the AB-BAB configuration is up to 10% more efficient at very light loads.

TABLE I

Parameters of DAB experimental setup

| DAB Device/component/Parameter | Part #/Value |
|---|---|
| MOSFET | C3M0065090D |
| $V_{in}$ & $V_{out}$ | 150 V |
| $L_p$ | 184.7 uH |
| $L_s$ | 185.8 uH |
| $C_p$ | 18 nF |
| $C_s$ | 18 nF |
| Switching frequency | 85 kHz |
| Z height | 160 mm |
| Unregulated power | 700.6 W |

TABLE 2

Parameters of DAB experimental setup

| DAB Device/component/Parameter | Part #/Value |
|---|---|
| MOSFET | C3M0065090D |
| $V_{in}$ & $V_{out}$ | 150 V |
| $L_p$ | 199.6 uH |
| $L_s$ | 199.6 uH |
| $C_p$ | 18 nF |
| $C_s$ | 18 nF |
| M | 80 uH |
| $L_a$ & $L_b$ | 750 uH |
| $C_a$ & $C_b$ | 940 uF |
| Switching frequency | 85 kHz |
| Z height | 100 mm |
| Unregulated power | 721.6 W |

Example #2: Grid Integration of a Bi-Directional IPT System Utilising a DBAB for Vehicle to Grid/Grid to Vehicle Applications Vehicle to grid/grid to vehicle (V2G/G2V) systems have been proposed to provide many beneficial services to the utility grid. The main benefit is the ability to access the increased energy storage capability provided by EV's. This is especially useful when power systems are heavily reliant on renewable energy generation, as fluctuations in power generation can be absorbed by EV batteries. This ensures grid voltage stability. Furthermore, V2G/G2V systems can provide other grid services such as the ability to inject reactive power and harmonics into the grid, resulting in an improved grid power factor, efficiency and stability. Conventionally, a grid tied converter, which is responsible for grid current regulation, feeds an inverter, which drives an isolation technology (IPT is used as the isolation technology in this example). However, a large storage capacitor is required in such a system to decouple the power ripple resulting from single-phase grid, and the DC power supplied to the EV battery. Hence a bulky and expensive electrolytic capacitor is placed at the DC-link between the grid tied converter and the inverter. Moreover, due to the low voltage rating of electrolytic capacitors, the DC link voltage is limited to well below the voltage rating of wide bandgap devices.

Figure 7:
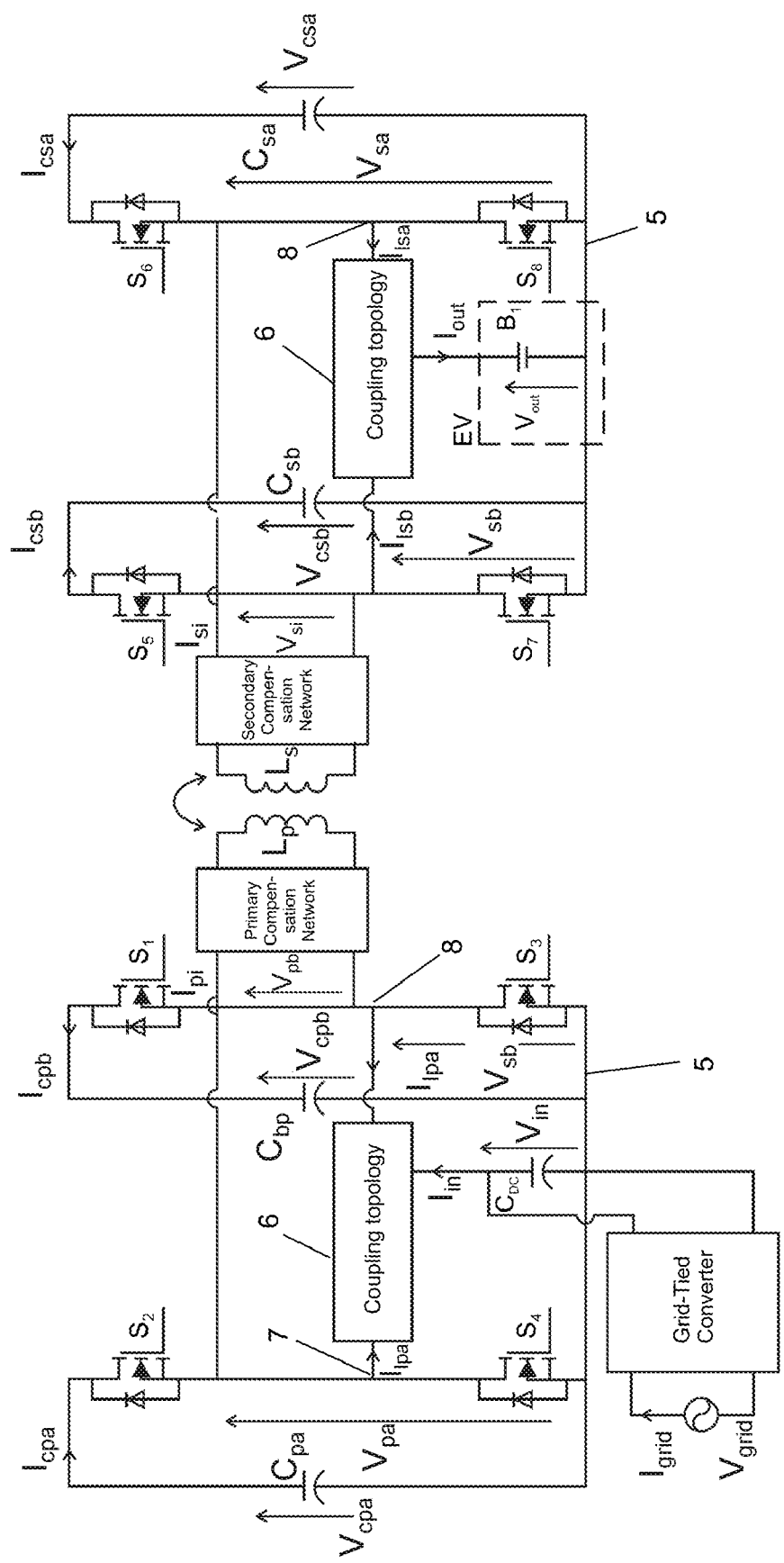
FIG. 7 is a circuit diagram of DBAB based grid connected bi-directional (BD)-IPT system for V2G/G2V applications.
Figure 8A:
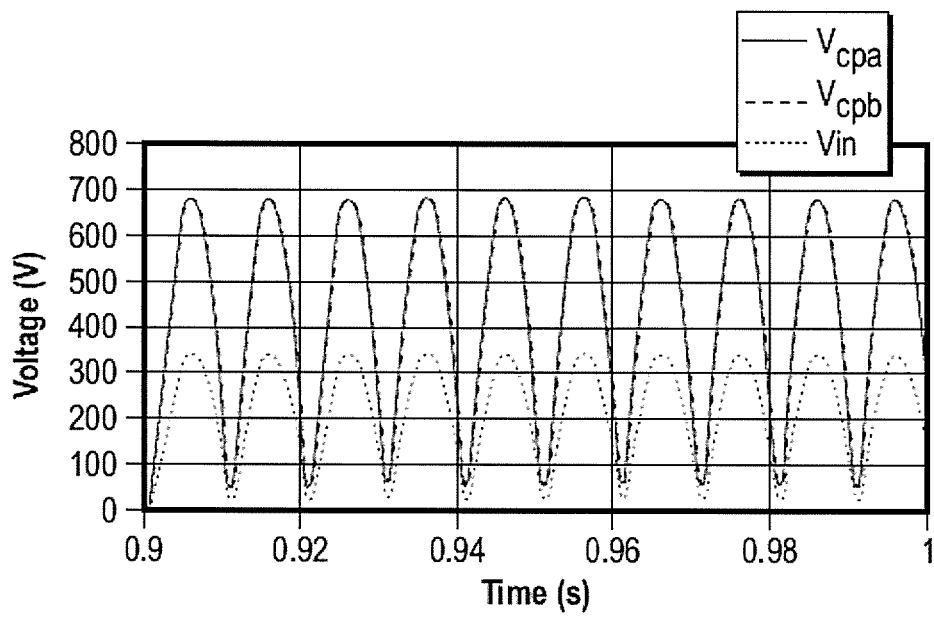
FIG. 8 shows simulated waveforms produced by a grid connected DBAB, (a) Soft DC-link voltage and boosted converter voltage, (b) Grid input voltage and current, (c) Voltage modulation on secondary DC side capacitors, (d) Output power.
Figure 8B:
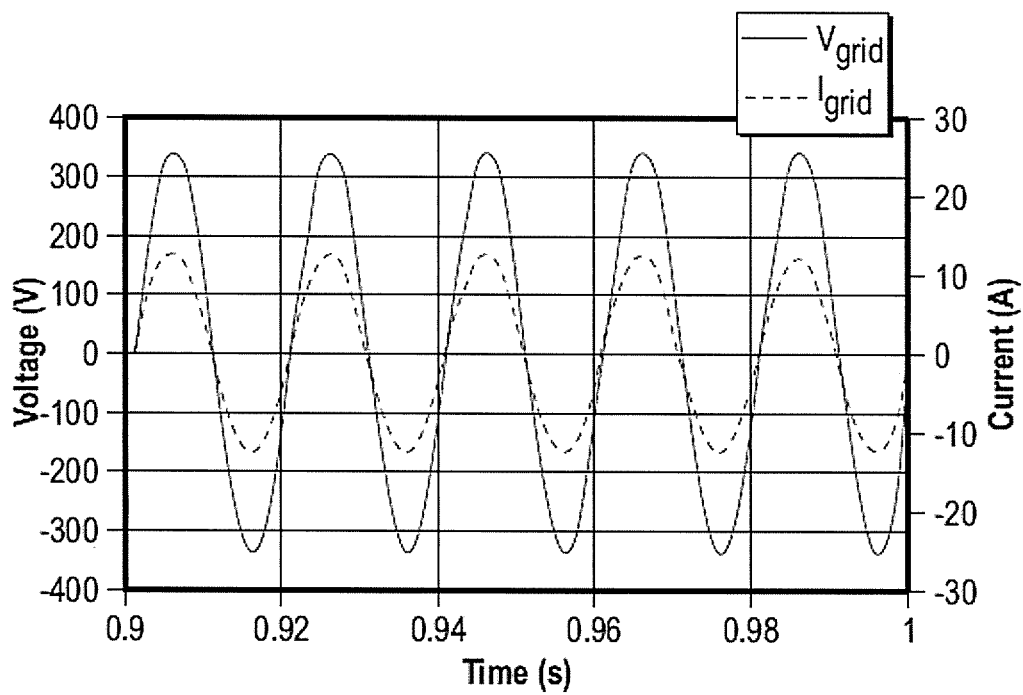
Figure 8C:
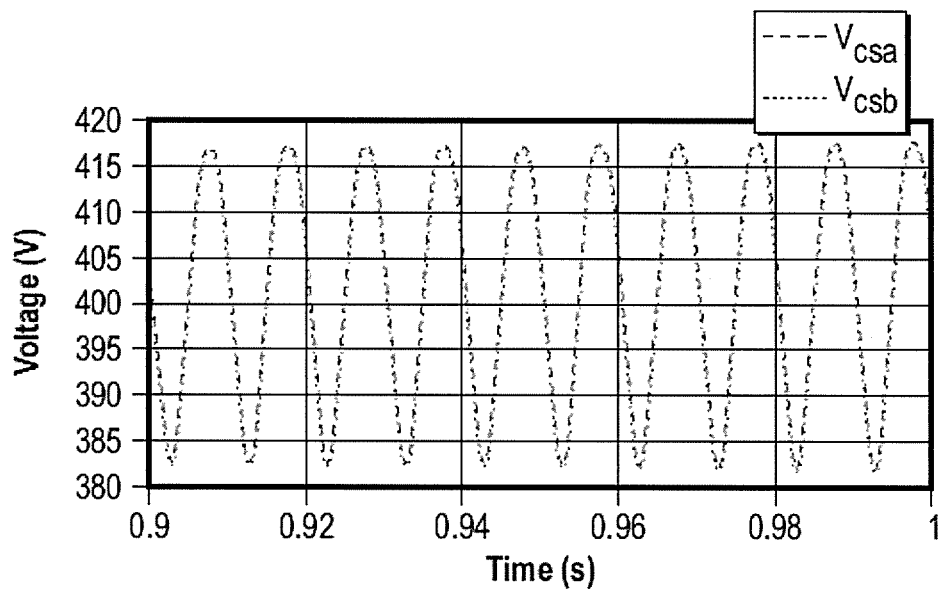
Figure 8D:
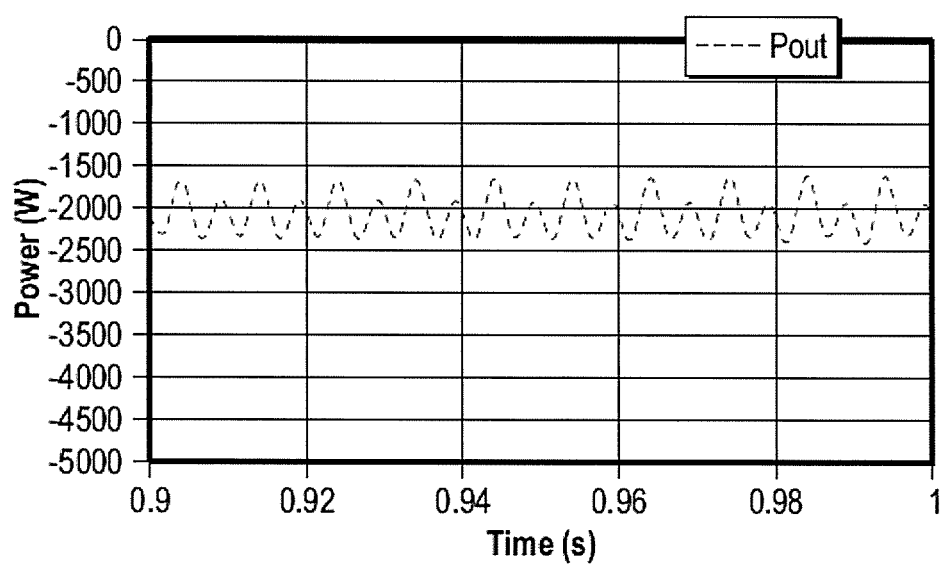

Referring to FIG. 7, an example is shown which illustrates how a DBAB based grid connected bi-directional IPT (BD-IPT) system for V2G/G2V applications can overcome the aforementioned problems. The proposed configuration also requires a grid-tied converter, but a large electrolytic capacitor is no longer required on the DC link. This is because, the voltage across the inverter leg DC capacitors ($C_{pa}$, $C_{pb}$, $C_{sa}$, $C_{sb}$) can be actively controlled through duty cycle modulation (as described in the preceding example above). Hence, energy can be stored or extracted out of these capacitors, allowing for the absorption of the mains frequency power ripple. Furthermore, the high DC voltage and large voltage ripple on these capacitors reduce the overall capacitance requirement, permitting the use of film capacitors.

This system was simulated in MATLAB/PLECS using the parameters described in Table III. A series-series compensation network, and the coupling topology FIG. 4, (b) was chosen. The results of this simulation are illustrated in FIG. 8, where graph (a) shows the soft DC-link voltage and also the voltage boosting characteristic of the BAB. Graph (b) shows the grid voltage and current, however, the grid current is not regulated by the grid-tied converter as with a conventional system.

In this system the grid-tied converter is simply an active rectifier and the grid current is regulated by the primary converter by modulating the phase angle between the two converter legs as discussed in the previous example. Graph (c) displays the voltage modulation on $C_{sa}$ and $C_{sb}$ required to absorb the low frequency power ripple. The boosting characteristic of the converter is shown again, as the average capacitor voltage is at twice the EV battery voltage. The result of this modulation is shown in graph (d), the higher frequencies present in the output power can be attributed to the voltage modulation of the DC side capacitors.

TABLE III

Parameters of DAB simulation setup

| DAB Device/component/Parameter | Part #/Value |
|---|---|
| MOSFET | C3M0065090D |
| $V_{grid}$ | 230 V |
| $C_{dc}$ | 10 uF |
| $C_{pa}$ & $C_{pb}$ | 1 uF |
| $C_{sa}$ & $C_{sb}$ | 250 uF |
| $C_p$ & $C_s$ | 17.5 nF |
| $L_p$ | 199.58 uH |
| $L_s$ | 199.61 uH |
| M | 99.7 uH |
| Switching frequency | 85 kHz |
| $P_{out}$ | 700.6 W |

Example #3: IPT Technology Based Dynamic EV Charger

Electric vehicles are an emission free alternative to conventional vehicles. However, the energy density of battery technology available today lead to frequent and time-consuming charging requirements.

Dynamic EV charging will help reduce energy storage requirements in EV's, as charging can take place while driving the vehicle. Dynamic charging requires multiple primary magnetic couplers to be placed under the surface of the road. Each coupler (or few couplers) typically requires its own primary converter and each primary converter requires a supply. A cost effective solution is to provide a DC voltage distribution network, which eliminates the requirement of multiple grid-tied converters.

Figure 9:
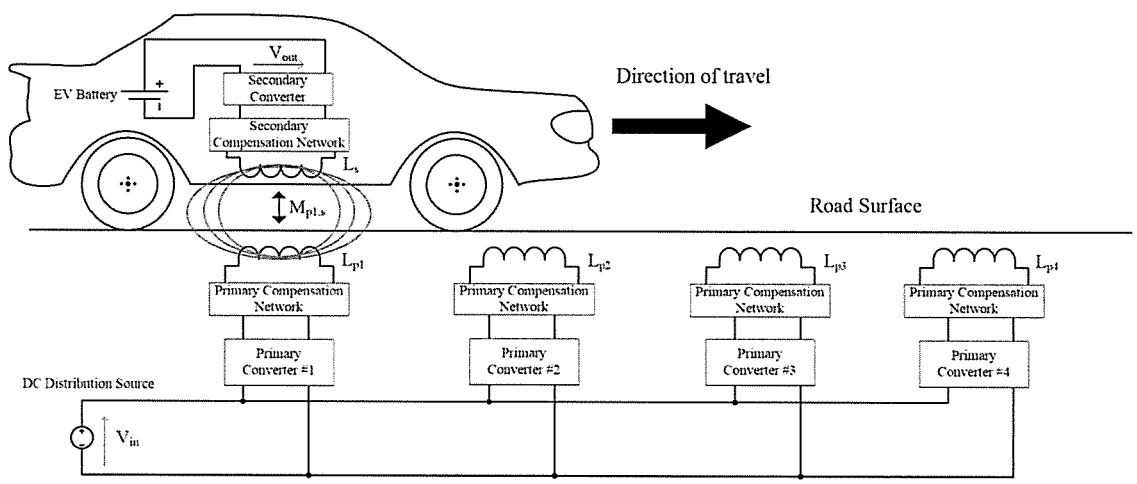
FIG. 9 illustrates a dynamic vehicle charging application of a converter (BAB) of the present invention.

Such a situation is shown in FIG. 9. For safety and compatibility reasons, the DC voltage network would operate at approximately 380V to 400V which may become a standard for low voltage DC distribution. Due to the much higher peak power required to be delivered by a dynamic charging system, primary magnetic coupler currents will be very high if supplied with a low voltage source. Higher currents lead to undesired heating of the magnetic coupler, which is further exacerbated by the lack of any airflow. However, if a BAB topology is used as the primary converter, the primary magnetic coupler can operate at twice the voltage of the DC distribution system reducing heating affects due to lower current and improving overall system efficiency.

Example #4

Figure 10:
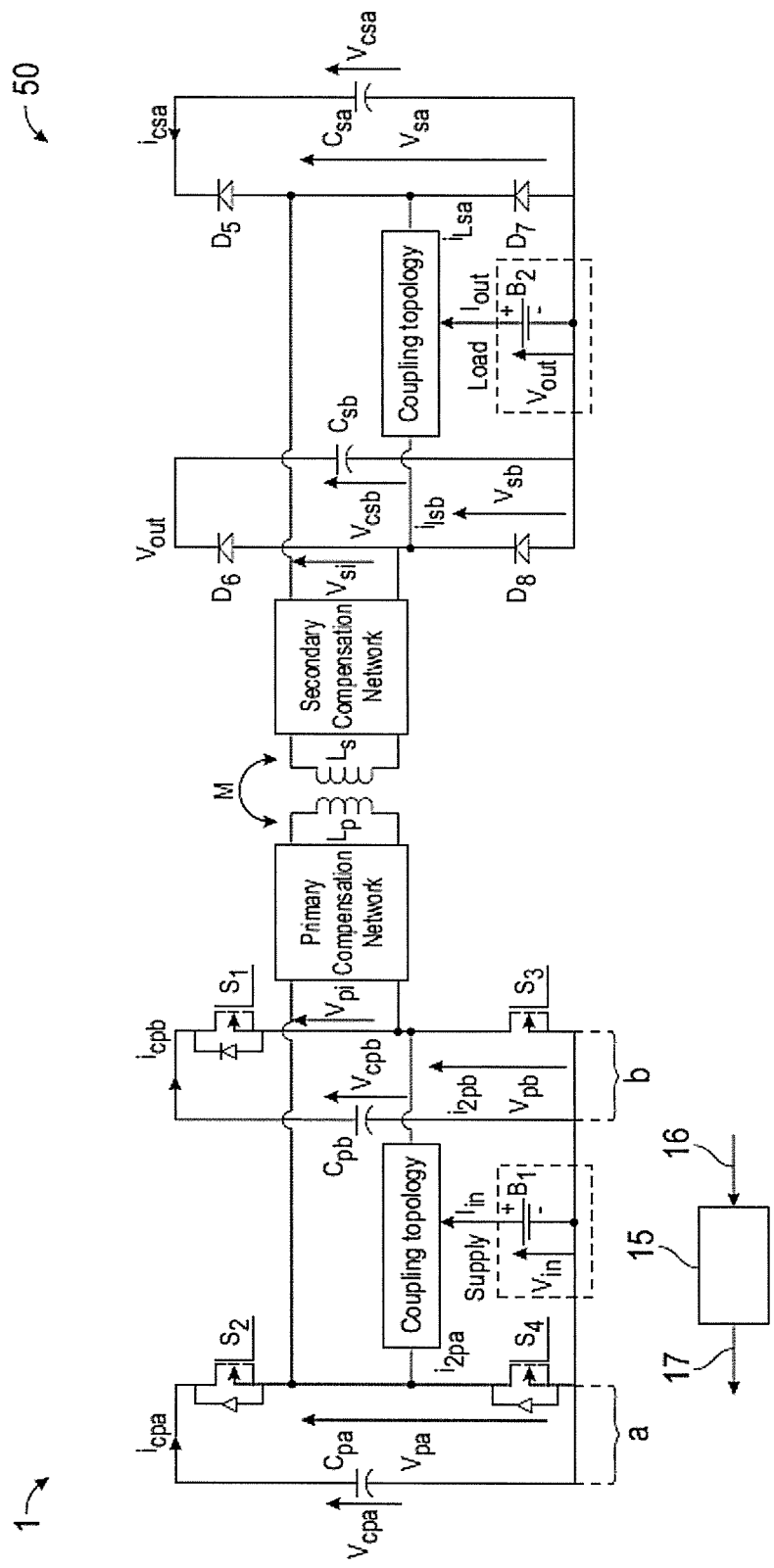
FIG. 10 illustrates another example of an IPT system incorporating a BAB topology.

FIG. 10 shows another example showing IPC system in which the primary power supply comprises a boost active bridge converter as described above, but the secondary is 50 is simplified having diodes D5 to D8 rather than switches. Other aspects of the BAB topology remain the same in the secondary. The use of simple diode rectifiers enables the pick-up to be simplified, and is appropriate where only uni-directional power flow from the primary to the secondary is required. The wave forms in the pick-up in this example is similar to that observed with the original examples described elsewhere in this document. However, if pick-up power needs to be regulated then a regulator will be required following the rectifier.

BAB Converter Configuration Description

Figure 11:
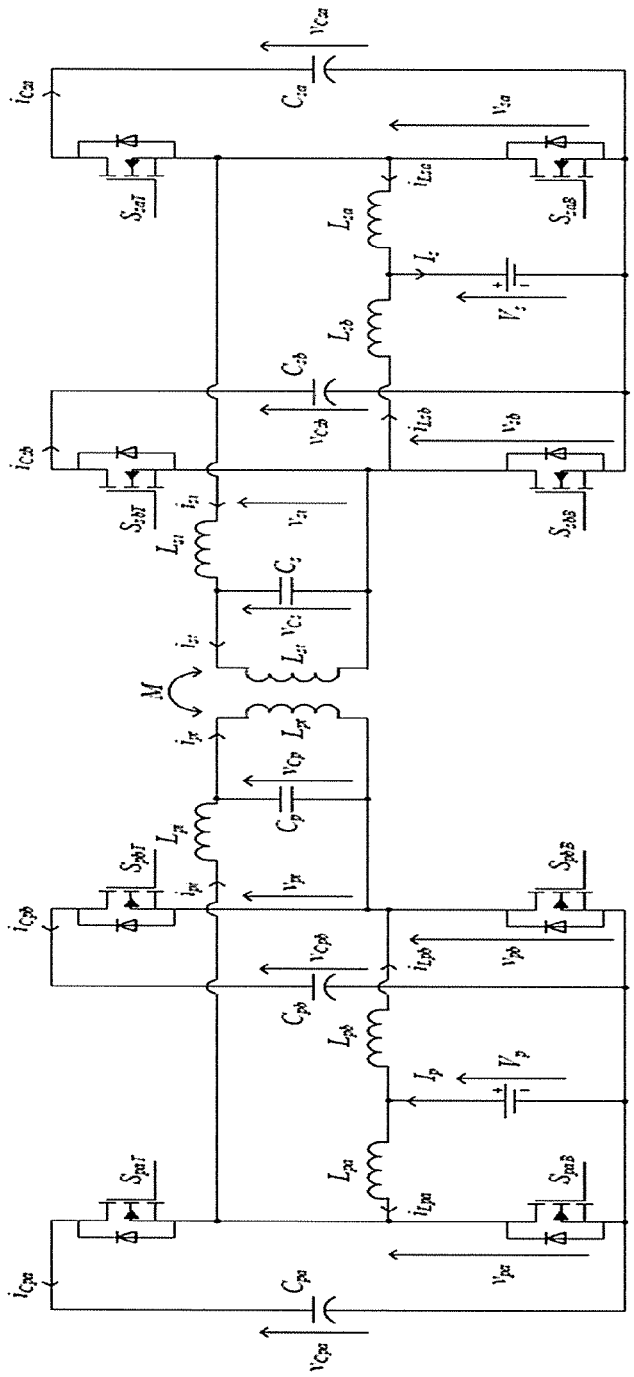
FIG. 11 illustrates another example of BAB-based BT-IPT system topology.

The proposed BAB technology can replace the VSI found in commonly used uni or bi-directional IPT systems regardless of the compensation topology and the type of magnetic coupler employed. However, to highlight all the benefits of the BAB technology, including its ability to inherently eliminate circulating currents, an LCL tuned BD-IPT system, which utilises BAB's as both the primary and secondary inverters, shown in FIG. 11 (similar example as FIG. 7 or 10), is considered as an example in this example. The primary BAB of this system drives the primary magnetic coupler, Lpt, through Lpi and Cp, which together forms an LCL compensation network. Similarly, the secondary is composed of a BAB and an LCL network formed by Lst, Cs and Lsi. In a typical application, the supply to the primary BAB is derived through a grid tied inverter. For simplicity, the DC link voltage generated by this grid tied inverter is modelled by a DC voltage source, Vp. The secondary BAB will be directly connected to the EV battery, which is modelled by Vs.

Since the electronics on the primary and secondary side are identical, the operating principles discussed below pertain to both sides. However, to ensure generality, subscript x is used, x∈{p, s}, where subscripts p and s represent the primary and secondary side, respectively. Each side consists of two halfbridges; half-bridge a, Bxa, which is made up from switch pair SxaT and SxaB; and half-bridge b, Bxb, which is made up from switch pair SxbT and SxbB. Vx is connected to both, Bxa and Bxb through inductors Lxa and Lxb, respectively. The capacitors Cxa and Cxb, are connected across the DC sides of Bxa and Bxb, respectively. This arrangement forms an interleaved buck-boost converter between Vx and Cxa; as well as Vx and Cxb. The combination of Bxa and Bxb also form a quasi-full-bridge inverter, whose output, vxi, drives the corresponding LCL network.

Bxa and Bxb are switched in a complementary manner at fs, which is equal to, or in proximity to, the resonant frequency of the two LCL networks, $f_r$. As a result, the output voltages, vxa, produced by Bxa, and vxb, produced by Bxb, are 180 degrees out of phase. The duty-cycles of vxa and vxb are defined as Dxa and Dxb, respectively. Since the average of vxa and vxb should be equal to Vx at steady-state, the voltages VCxa and VCxb are a function of Dxa and Dxb, respectively, as given by, $$V_{Cxa}D_{xa} = V_{Cxb}D_{xb} = V_x$$

Figure 12:
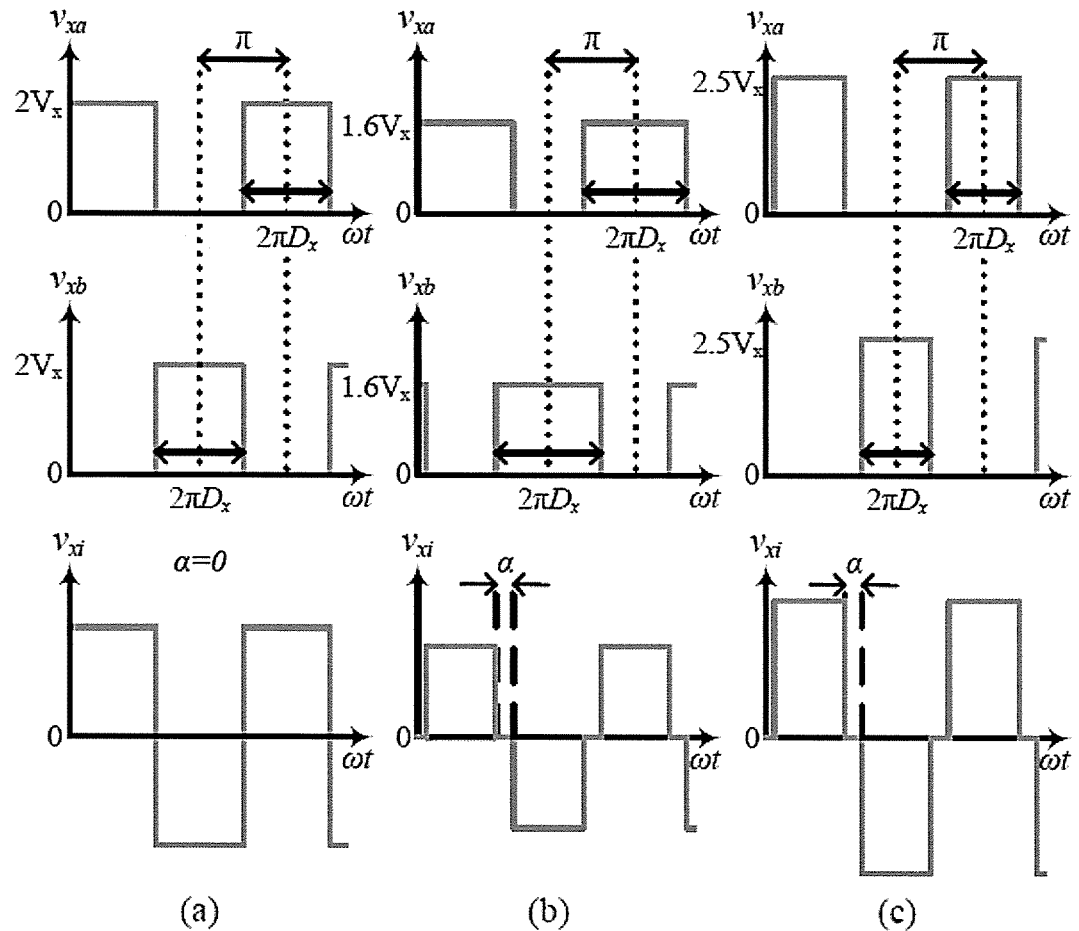
FIGS. 12A-12C are graphs showing voltages produced by the BAB utilising the proposed switching scheme at (a) Dx=50%, (b) Dx=60% and (c) Dx=40%.

Equation (3) shows, that a nominal duty-cycle of 50% doubles Vx, and reducing/increasing the duty-cycle, results in a higher/lower voltage across each half-bridge, as depicted in FIG. 12. FIGS. 12(a)-(c) illustrate the Voltages produced by the BAB model utilising the proposed switching scheme at (a) Dx=50%, (b) Dx=60% and (c) Dx=40%

The output of the quasi-full-bridge converter, vxi, is the difference between voltages vxa and vxb, and is also depicted in FIG. 12. As such, Bxa and Bxb are normally operated with equal duty-cycles to produce a symmetric vxi, and the duty-cycle of each side can be referred to as simply Dx i.e. Dxa=Dxb=Dx. Similar to the control strategies proposed in:

$$V_{pr} = j\omega_s M I_{st} \text{ and } V_{sr} = j\omega_s M I_{pt}$$

the RMS value of vxi, produced by the BAB, can be controlled using phase-shift modulation, while Dx is set to 0.5. However, the proposed BAB can also be controlled by modulating Dx, while Bxa and Bxb are driven 180 degrees out of phase. As shown in FIG. 12, increasing Dx beyond 0.5, lowers the RMS value of vxi, by increasing the duration of 0 V level, $\alpha$, as well as reducing the amplitude of vxi. Therefore, in contrast to traditional phase-shift modulation scheme, the new duty-cycle control scheme employed by the BAB, will reduce the control effort required and facilitate zero voltage switching (ZVS) of devices over a wider load $$\alpha_x = \begin{cases} \pi - 2\pi D_x & D_x \leq 0.5 \\ \pi = 2\pi(1 - D_x) & D_x > 0.5 \end{cases}$$

Due to non-ideal conditions, a conventional full-bridge converter that is controlled using phase-shift modulation, may generate an output voltage with a slight DC offset. As mentioned previously, this DC offset will lead to a large circulating DC current through the inductors of an LCL tuned BD-IPT system. To resolve this issue, a DC blocking capacitor is normally placed in series with one of the inductors, adding to system cost and size. However, in the BAB, as given by (1), the two capacitors employed across each half-bridge self-adjust VCxa and VCxb to eliminate the DC offset of vxi. Therefore, as evident from FIG. 11, the proposed BD-IPT system does not employ DC blocking capacitors.

Figure 13:
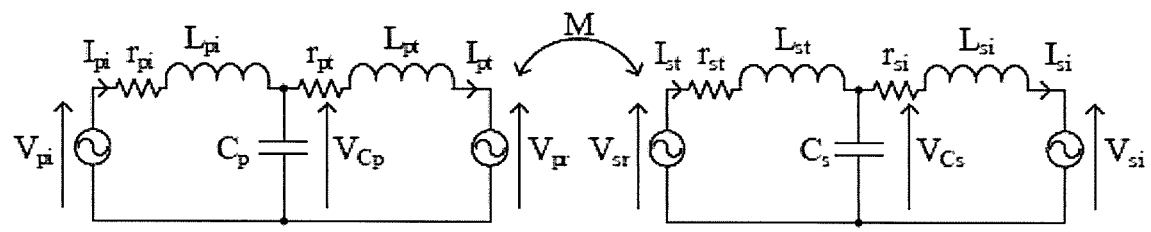
FIG. 13 illustrates equivalent phasor domain representation of the LCL networks.

The following model elaborates upon the power transfer characteristics, component stresses and efficiency, of the proposed system. FIG. 13 depicts an equivalent phasor domain representation of the LCL networks. Typically, to minimise the VA rating of the converters and to maximise the power transfer, both LCL networks are tuned to $f_T$. Therefore, $$(2\pi f_T)^2 = \omega_T^2 = \frac{1}{L_{pi}C_p} = \frac{1}{L_{pt}C_p} = \frac{1}{L_{si}C_s} = \frac{1}{L_{st}C_s}$$

However, in EV charging applications, misalignment between magnetic couplers invariably results in changes to the self-inductances, Lpt and Lst, detuning the LCL networks. Moreover, in some cases, at the cost of converter VA rating, the networks are intentionally de-tuned to present a slightly inductive input impedance at the switching frequency, fs ($\omega_s$), to ensure a wide ZVS range.

In contrast to a traditional full-bridge based BD-$_s$IPT system, the output power of the proposed BAB based system, is a function of control variables, Dp and Ds, as well as $\alpha_p$ and $\alpha_s$. Nominally, the converters are operated with Dp=Ds=50%, when delivering rated power. Under these conditions, accordingly with equation (5), being a function Dp and Ds, both $\alpha_p$ and $\alpha_s$ are 0, respectively. As discussed in the previous section, the output power can be regulated by controlling Dp and Ds. Increasing one or both of the duty-cycles above 50% results in reduced output power. However, increasing Dp and/or Ds also leads to in an increase in $\alpha_p$ and/or $\alpha_s$. Thus, even a small increase in the duty-cycles translates to a much larger reduction in output power, enabling the converter to maintain ZVS conditions over a wider load range. Unlike in traditional BD-IPT systems, the output power of the proposed BAB based system can be increased by decreasing one or both of the duty-cycles below 50% to compensate for variations in system parameters.

Figure 14:
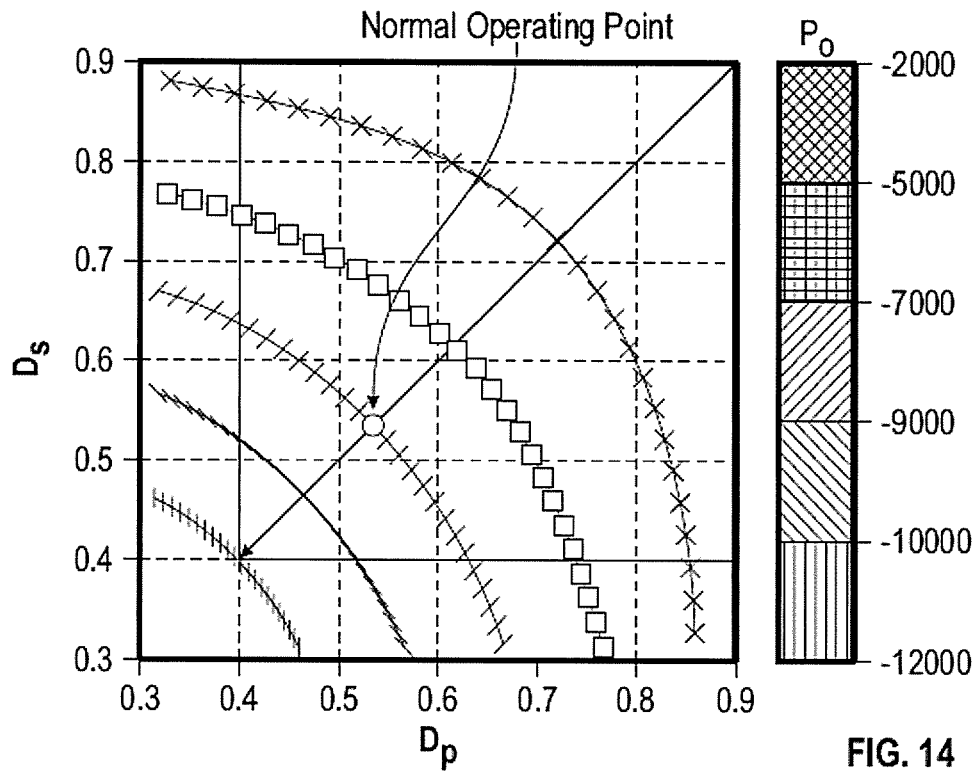
FIG. 14 depicts an example of graph showing output power normalised to rated output power of the BAB system, as function of Dp and Ds.

The operating region of the proposed converter can be selected based on the symmetry of the circuits and the desired output power range. For example consider a symmetric system, whose input and output supply voltages are equal and so are the primary and secondary coil quality factors. Therefore, the condition for minimising conduction losses in the compensation networks is Dp=Ds. Thus, based on this condition, the desired region of operation is highlighted by the red line in the FIG. 14. The nominal operating point is chosen such that it meets the rated power of the system and to provide enough head room to increase the primary or secondary VA in case of input/output voltage changes or coupler misalignments. The practical limit of the primary and secondary VA's are defined by the regions shaded in grey.

To achieve high overall efficiency over the entire load range, the converter should be designed to ensure ZVS operation over the desired region of operation. The ZVS Range of the proposed converter is a function of the converter switching frequency, compensation network tuned frequency, the value of the DC inductors and the output power. However, since the switching frequency and the output power range are usually constrained, the ZVS range of the converter can be adjusted by either changing the compensation network tuning or the value of the DC inductors.

Figure 15:
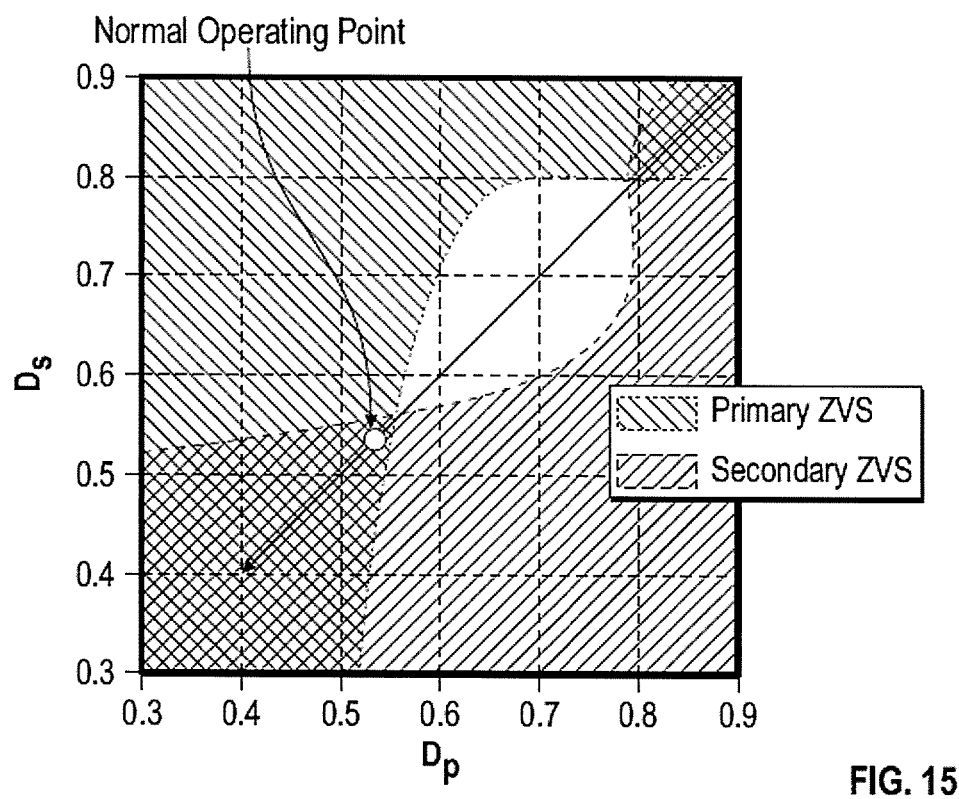
FIG. 15 shows the ZVS range of the BAB system operating with a switching frequency of 85 kHz, a tuned frequency of 87 kHz and the DC inductors all designed to 430 uH.
Figure 16:
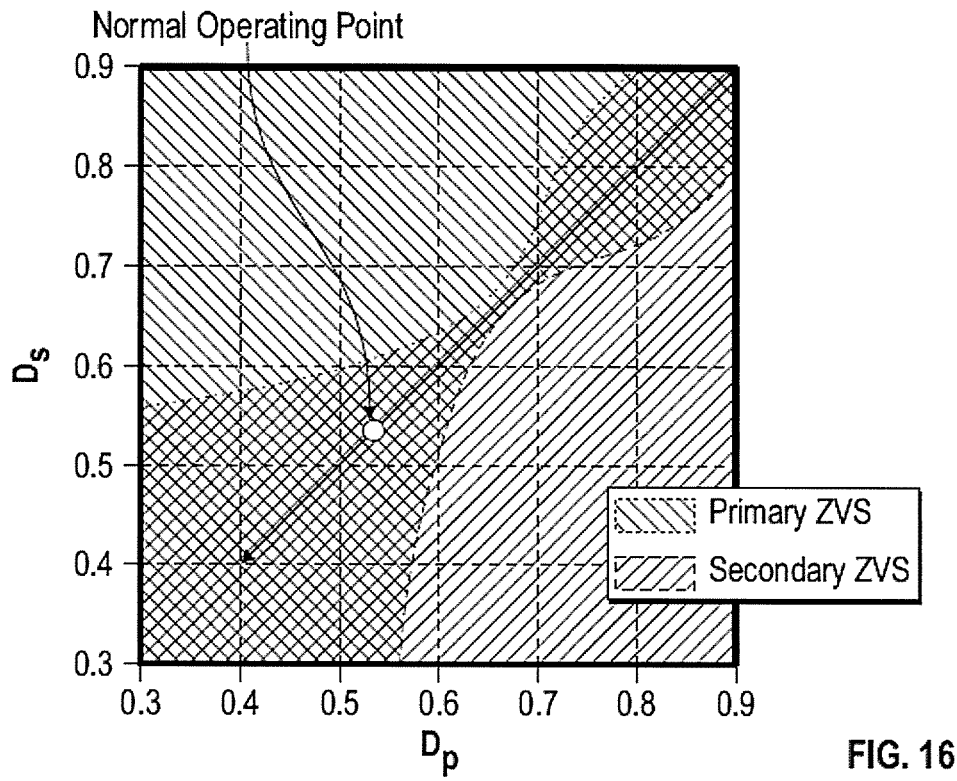
FIG. 16 shows the ZVS range of the BAB system operating with a switching frequency of 85 kHz, a tuned frequency of 88 kHz and the DC inductors all designed to 170 uH.

Consider the system discussed above, operating with a switching frequency of 85 kHz, a tuned frequency of 87 kHz and the DC inductors all designed to 430 uH. The ZVS range of this system is shown in FIG. 15. Clearly, the converter is hard switched during a large proportion of the desired region of operation. Therefore, the tuned frequency can be adjusted to 88 kHz and the DC inductor values to 170 uH. The resulting ZVS range is shown in FIG. 16.

Maximum Efficiency Tracking

Figure 17:
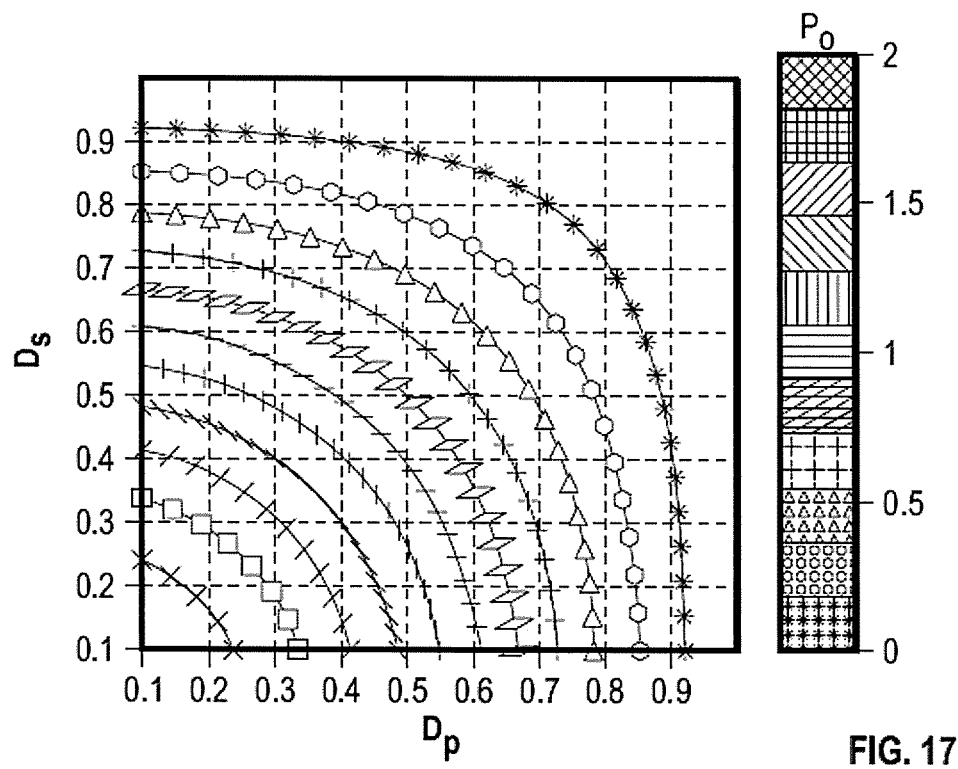
FIG. 17 depicts another example of graph showing output power normalised to rated output power of the BAB system, as function of Dp and Ds.

Power loss associated with ipt and ist accounts for a significant proportion of total power loss in a typical BD-IPT system. Thus, to maximise the power transfer efficiency, as discussed in [23], the losses in the couplers are matched. This can be achieved by controlling ipt and ist, such that $i^2_{pt} r_{pt} = i^2_{st} r_{st}$, and is referred to as impedance matching by controlling the operating Q. For example, consider a symmetric system, where primary and secondary circuits are identical. Output power normalised to rated output power of this system, as function of Dp and Ds, is shown in FIG. 17. In this example, when delivering rated power, efficiency would be maximised by operating at point A. However, consider an asymmetric case when Lst is physically smaller but has the same self-inductance as Lpt, which is often the case for EV charging applications. Typically, a smaller coupler implies higher resistive losses due to the reduced winding area. As such, to maximise power transfer efficiency while still delivering rated power, the operating point can be shifted towards B to increase ipt and reduce ist. Similarly, consider another example, where the EV battery voltage is increasing as it charges at a constant power level. The operating point, which is close to point C when the battery is depleted, can be shifted towards point B during the charge process in order to maximise power transfer efficiency. In contrast, impedance matching is typically achieved at the expense of efficiency and power transfer capability in a traditional full-bridge converter based BD-IPT system.

Reduced Conduction Losses

The conduction losses associated with the BAB based system can be divided into conduction losses in the switches, LCL networks and the DC inductors. In comparison to a traditional full-bridge based BD-IPT system, under nominal operating conditions, the primary and secondary LCL networks are driven at twice Vp and Vs, respectively, halving the currents in the LCL networks. Thus, although a higher magnetic coupler inductance is required to achieve the same level of power transfer, effectively the conduction losses in the LCL networks are lowered by about 70%. Whereas, due to the addition of the currents flowing through the DC inductors, the currents through the top and bottom switches of each half-bridge are asymmetric, leading to unevenly distributed switch conduction losses. the switch conduction losses. In the present case the switch conduction losses of the BAB are lowered by approximately 50%. Since the secondary of the proposed system utilises a BAB, the switch conduction losses of the secondary are also significantly reduced. The additional losses associated with the DC inductors used by the BAB's of the proposed system are significantly lower in comparison to the reduction in conduction losses of the switches and LCL networks. As a result, the overall efficiency is improved.

Reduced Current Ripple

As the two half-bridges together with the two DC inductors of each BAB forms two identical interleaved buck-boost converters, the switching frequency current ripple present in Ip and Is is greatly reduced. Under nominal operating conditions, $\Delta Ip\_pk$ is zero. As the duty-cycle deviates from 50%, $\Delta Ip\_pk$ increases and Ip appears to be at twice the switching frequency. However, it is comparatively lower in amplitude than $\Delta I_{Lpa\_pk}$ under all operating conditions. Similarly, the ripple current present in Is on the secondary BAB is also reduced.

Example #5

In order to illustrate the viability of the proposed system as well as to validate the mathematical models developed, a 3.5 kW prototype was designed and built. Circuit parameters of this prototype system are listed in Table IV. Since Vp is 280 V, under nominal operating conditions where Dp is 50%, in accordance with (1), the amplitude of $v_{pi}$ is approximately 560 V. This is evident from FIG. 12 (b), which depicts the experimental waveforms of vpa, vpb and vpi. When Dp is increased to 60%, as shown by FIG. 12 (a), the amplitude of vpi is lowered to 467 V and $\alpha_p$ is increased, resulting in an overall reduction in Pout. The system's ability to compensate for a low input voltage was also simulated by reducing Vp to 250V and setting Dp to 40%. Although this resulted in an increase in p, the amplitude of vpi was increased to 595 V as shown by FIG. 12 (c), hence delivering rated power to the load.

Figure 18:
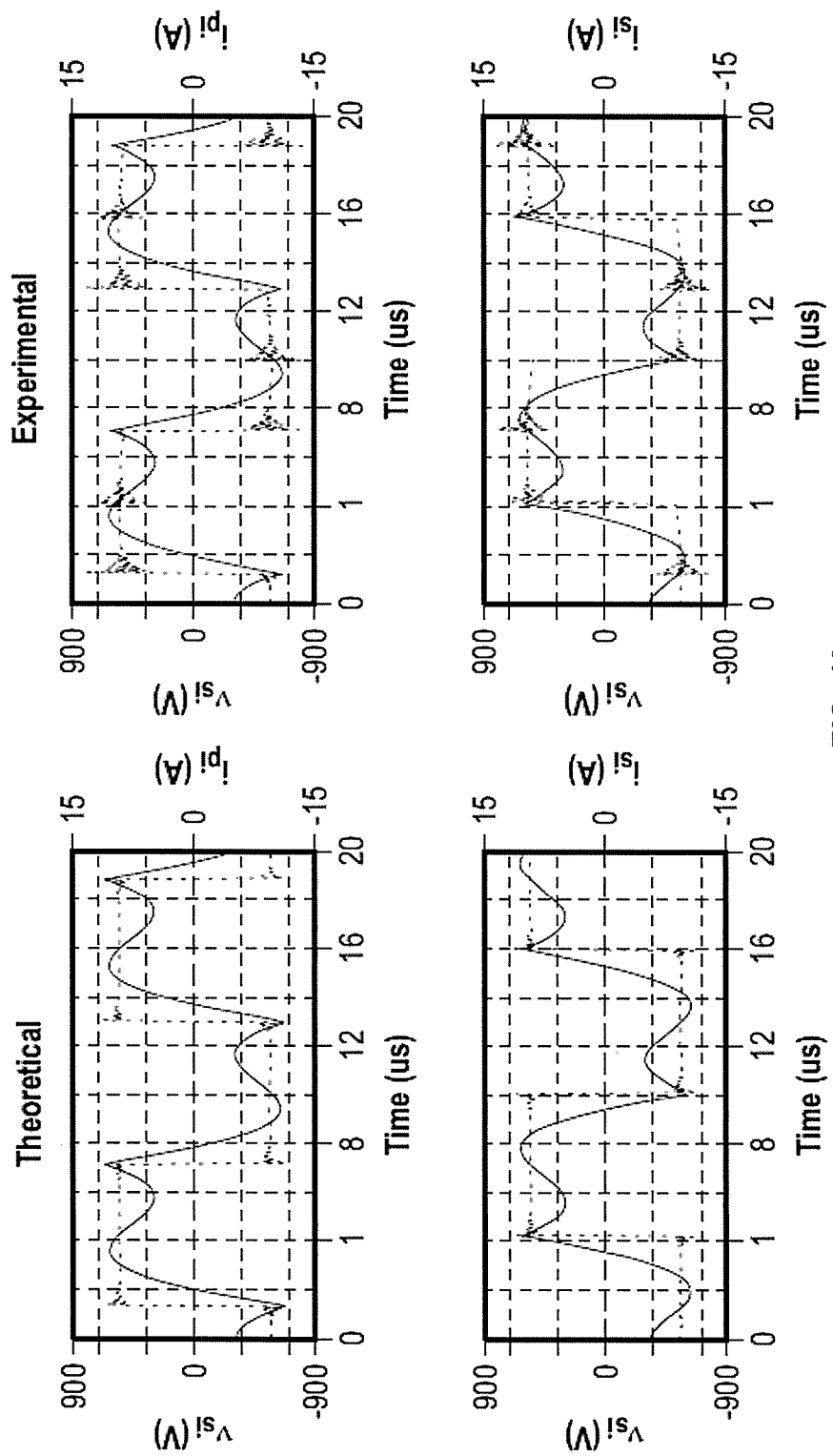
FIG. 18 shows the graphs of theoretical and experimental waveforms when operating at 50% duty cycle.
Figure 19:
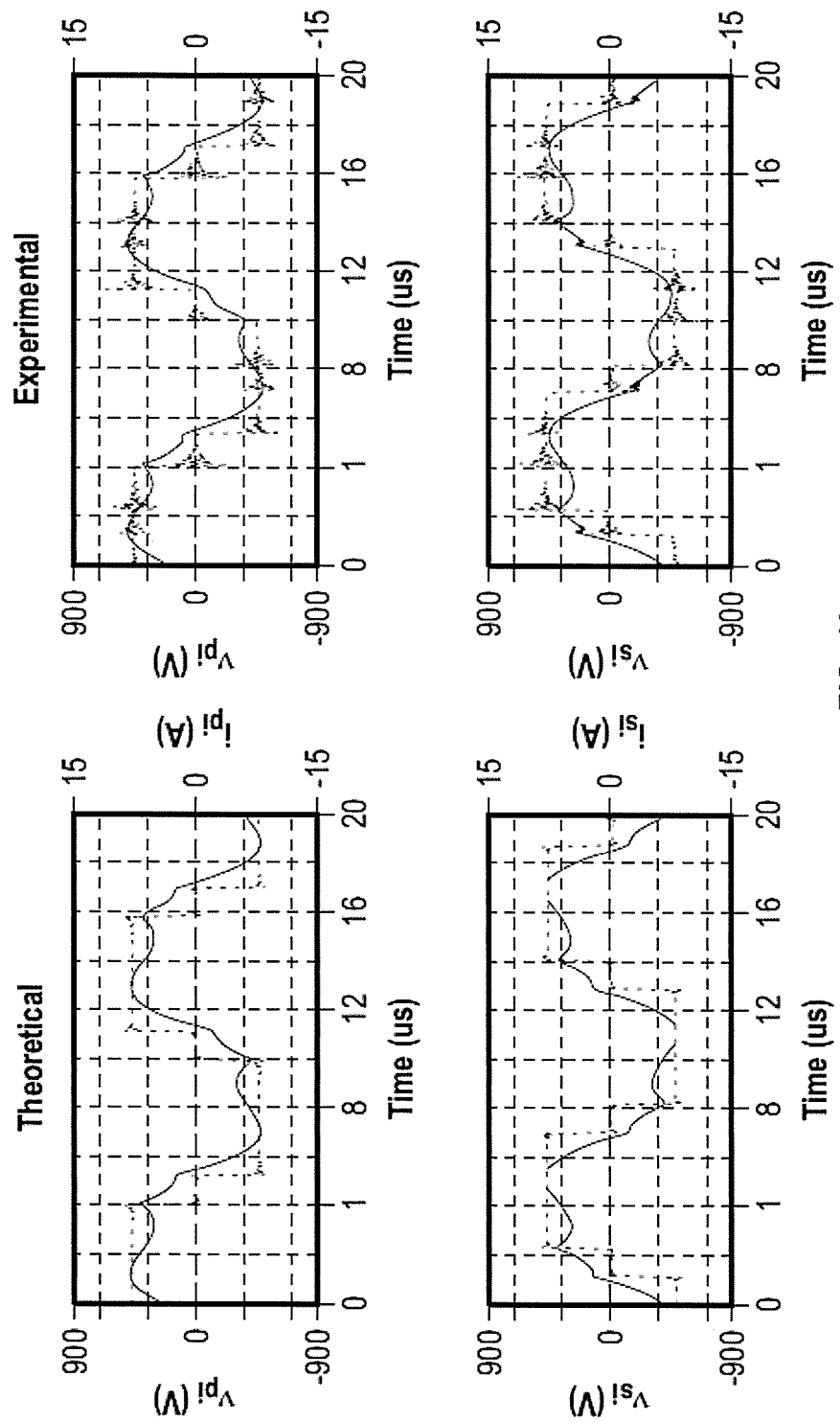
FIG. 19 shows the graphs of theoretical and experimental waveforms when operating at 60% duty cycle.

Steady-state waveforms captured from the prototype for various operating conditions were compared to theoretical waveforms. For example, experimental waveforms obtained when BAB's are operated at a duty-cycle of 50% and 60% are compared with theoretically obtained waveforms in FIG. 18 and FIG. 19, respectively. As evident, the experimental and theoretical waveforms present excellent correlation. It is also evident from ipi and isi waveforms, that operating at 60% duty-cycle lowers power transfer.

Figure 20:
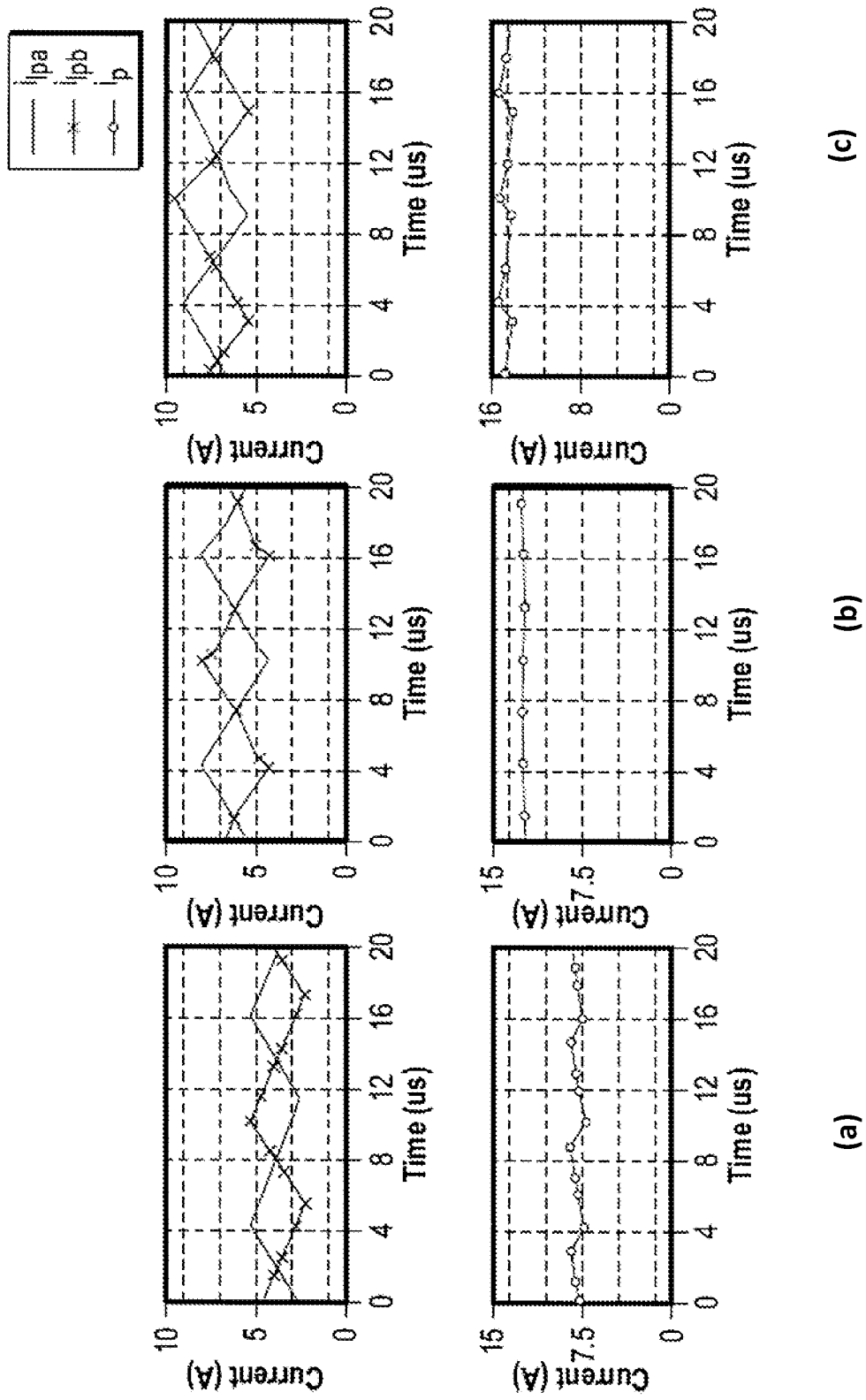
FIGS. 20A to 20C illustrate the graphs of Experimental current waveforms produced by the primary BAB at (a) 60%, (b) 50% and (c) 40% duty-cycles.

FIG. 10 displays Ip, iLpa and iLpb, at 40%, 50% and 60% duty-cycles. Theoretical peak inductor currents can be calculated as 9.3 A, 8 A, and 5.6 A, under 40%, 50%, and 60% duty-cycle operation, respectively. The experimental results shown in FIG. 20, closely matches these theoretical values. Moreover, as evident from FIG. 20 (b), $\Delta Ip\_pk$ is nearly zero when operated at 50% duty-cycle. Furthermore, $\Delta Ip\_pk$ when operated at a duty-cycle of 40% and 60% can be calculated as 0.7 A and 0.5 A, respectively, which is experimentally verified in FIG. 20.

Figure 21:
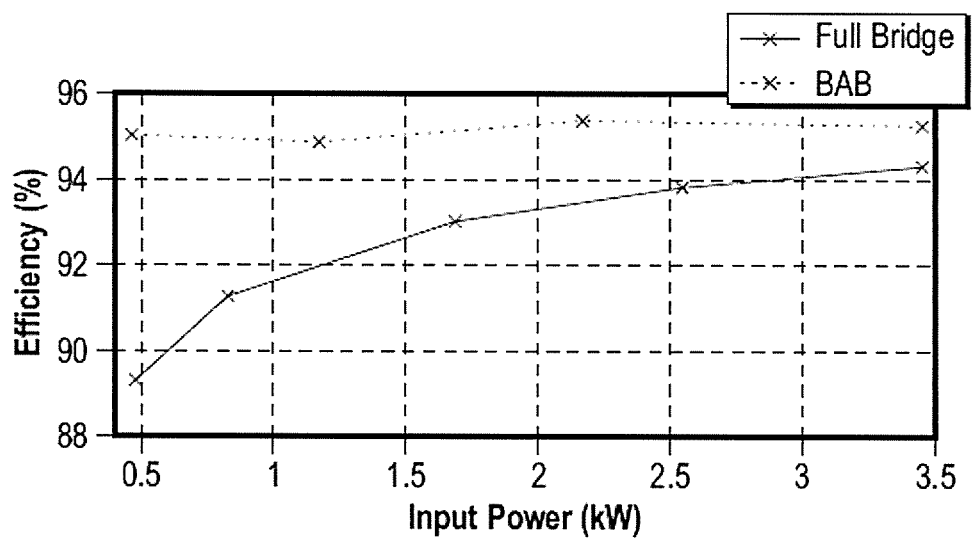
FIG. 21 illustrates the Efficiency comparison between the BAB based system and a full-bridge based system over varying loads in a graphical form.

FIG. 21 depicts the efficiency of the prototype as a function of Pout. Pout was regulated by adjusting both Dp and Ds equally. Varying the duty-cycle from 50% to 80% resulted in a power variation from 3.5 kW to 0.5 kW, respectively. As evident, the efficiency is approximately constant throughout the entire load range with a minimum of 94.9% at 1.2 kW and a maximum of 95.4% at 2.2 kW. In order to verify the improved performance of the proposed BAB based system, efficiency of a traditional full-bridge based BD-IPT system was compared over the same load range. The traditional system used for comparison employed the same magnetic couplers and the full-bridge converters derived power from the same 280 V DC sources. DC-blocking capacitors, Cpt and Cst, placed in series with the magnetic couplers, were also used to ensure 3.5 kW is delivered to the load when operated under nominal conditions. The output power of the system is regulated utilizing phase-angle modulation.

TABLE IV

Parameters of BAB experimental setup

| Parameter | BAB system | Full-bridge system |
|---|---|---|
| $V_p$ & $V_s$ | 280 V | 280 V |
| $L_{pt}$ | 43.4 µH | 43.4 µH |
| $L_{pi}$ | 40.3 µH | 21.2 µH |
| $C_p$ | 74.3 nF | 152.4 nF |
| $L_{st}$ | 46.28 µH | 46.28 µH |
| $L_{si}$ | 42.3 µH | 21.2 µH |
| $C_s$ | 69.66 nF | 149 nF |
| $C_{pt}$ | — | 155 nF |
| $C_{st}$ | — | 142.7 nF |
| $L_{pa}$ | 434 µH | — |
| $L_{pb}$ | 434 µH | — |
| $L_{sa}$ | 434 µH | — |
| $L_{sb}$ | 434 µH | — |
| k | 0.36 | 0.36 |
| Airgap | 150 cm | 150 cm |
| fr | 85 kHz | 85 kHz |
| MOSFET | C3M0065090D | C3M0065090D |

Table IV, lists the parameters of this system. As evident from FIG. 21, the full-bridge based system achieves a maximum efficiency of 94.3% when delivering 3.5 kW. However, the efficiency drops sharply to 89.3% as the output power is reduced to 0.5 kW. Overall, these results prove not only the superiority of the BAB technology in terms of efficiency, but also the greater flexibility to operate over a wide load range without the concern for lowered efficiency.

A novel power converter, named a Boost Active Bridge (BAB), to replace the full-bridge converters is presented. In order to fully exploit the capabilities of the proposed converter, a novel switching scheme was also presented. A comprehensive mathematical model that predicts steady-state currents, voltages and power transfer was also presented to highlight the key advantages of the BAB technology. One of the main advantages of the present BAB converter is its ability to operate at twice the input voltage and thus reducing conduction losses in the system. A higher voltage also provides an opportunity to effectively utilise wide bandgap devices, which are known for their high efficiency. Also, the converter of the present invention eliminates the issue of DC offset currents that may cause undesirable issue such as core saturation. Thus for example the need for AC coupling capacitor used in traditional system can be eliminated further improving the efficiency and reliability while lowering the cost.

A conventional system, which utilises a dual active bridge, lacks the capability to utilise wide bandgap devices to their full voltage rating. This limitation can be mainly attributed to limited supply and output voltages found in a typical application. Increasing the operating voltage of these systems can be a simple, yet expensive solution. For example, additional power converters can be used to boost/buck supply/load voltages, however an increased component count and reduced efficiency lead to an undesired solution. The converter of the present invention is an inexpensive solution which is capable of fully utilising the voltage rating of wide bandgap devices. The present BAB topology also offers all the advantages of additional pre/post regulating stages without the need for any extra switching devices.

The viability of the system has been verified through the development of a 3.5 kW prototype system. The experimental results prove that the proposed system offers a higher power transfer efficiency throughout the entire load range in comparison to a traditional full-bridge based system. The experimental results also validate further advantageous properties of the proposed system such as the elimination of the DC-blocking capacitor, the ability to track maximum efficiency over a wide range of system parameters and reduced current stresses in the components. Furthermore, the experimental results demonstrate a substantial improvement in efficiency under all operating conditions, validating the viability of the proposed converter.

Throughout the description like reference numerals will be used to refer to like features in different embodiments.

Unless the context clearly requires otherwise, throughout the description, the words "comprise", "comprising", and the like, are to be construed in an inclusive sense as opposed to an exclusive or exhaustive sense, that is to say, in the sense of "including, but not limited to".

Although this invention has been described by way of example and with reference to possible embodiments thereof, it is to be understood that modifications or improvements may be made thereto without departing from the scope of the invention. The invention may also be said broadly to consist in the parts, elements and features referred to or indicated in the specification of the application, individually or collectively, in any or all combinations of two or more of said parts, elements or features. Furthermore, where reference has been made to specific components or integers of the invention having known equivalents, then such equivalents are herein incorporated as if individually set forth.

In the foregoing Detailed Description, various features are grouped together in a single embodiment to streamline the disclosure. This method of disclosure is not to be interpreted as reflecting an intention that the claimed embodiments of the inventive subject matter require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

Any discussion of the prior art throughout the specification should in no way be considered as an admission that such prior art is widely known or forms part of common general knowledge in the field.

We claim:

1. A converter comprising:
 a bridge circuit having a first leg and a second leg, each leg including a high switch and a low switch, the high switches being connected to a first energy source and the low switches being connected to ground;
 a coupling network(s) having a first connection between the switches of the first leg and a second connection between the switches of the second leg; and
 a second (or multiple secondary) energy source(s) connected between the coupling network(s) and ground, wherein
 the coupling network comprises a first inductive element connected between the second energy source and the switches of the first leg, and a second inductive element connected between the second energy source and the switches of the second leg.

2. The converter of claim 1, wherein a third energy source is connected in parallel with the coupling network.

3. The converter of claim 2, wherein the converter is controlled to transfer energy between the second and third energy source to manage efficiency and power transfer of the converter.

4. The converter of claim 2, wherein the third energy source is an AC energy source, and is the only AC energy source of the converter.

5. A converter comprising:
 a bridge circuit having a first leg and a second leg, each leg including a high switch and a low switch, the high switches being connected to a first energy source and the low switches being connected to ground;
 a coupling network(s) having a first connection between the switches of the first leg and a second connection between the switches of the second leg; and
 a second (or multiple secondary) energy source(s) connected between the coupling network(s) and ground, wherein:
 the converter is a boost active bridge converter that includes a capacitor, the capacitor being the first energy source; and
 the converter includes a DC energy source having a positive terminal electrically located between the first leg and the second leg, wherein the DC energy source is the second energy source.

6. The converter of claim 5, wherein the coupling network comprises one or more inductors or capacitors arranged to interface the second or third energy source effectively with the first and second legs.

7. The converter of claim 5, further comprising a control circuit to control the switches of the converter.

8. The converter of claim 7, wherein the control circuit is also configured to control the duty cycle and/or phase of the switches.

9. The converter of claim 8, wherein the control of the duty cycle of the switches can control two output variables of the converter.

10. The converter of claim 7, wherein the control circuit includes one or more input control variables as inputs for controlling the switches.

11. The converter of claim 7, wherein the control circuit is configured to control energy transfer between each energy source(s) to optimise the efficiency and power transfer of the converter.

12. The converter of claim 5, wherein the converter is configured for bi-directional power transfer.

13. The converter of claim 5, wherein:
the converter is part of an IPT system, wherein the IPT system includes an IPT primary circuit and an IPT secondary circuit, and wherein the converter is part of the IPT secondary circuit.

14. The converter of claim 5, wherein the coupling network receives direct current from the first leg and the second leg, and wherein input into the bridge circuit is alternating current, and wherein output of the bridge circuit is direct current.

15. The converter of claim 5, wherein the converter charges the DC energy source.

16. The converter of claim 15, wherein the converter is an AC-AC converter.

17. The converter of claim 5, wherein the converter is configured for bi-directional power transfer.

18. The converter of claim 5, wherein the converter includes the capacitor and a second capacitor, the first leg being electrically connected to the capacitor, and the second leg being electrically connected to the second capacitor.

19. A converter comprising:
a bridge circuit having a first leg and a second leg, each leg including a high switch and a low switch, the high switches being connected to a first energy source and the low switches being connected to ground;
a coupling network(s) having a first connection between the switches of the first leg and a second connection between the switches of the second leg; and
a second (or multiple secondary) energy source(s) connected between the coupling network(s) and ground, wherein
the converter is controlled so that there is a difference in DC voltage on the first leg relative to the second leg, wherein the first leg in combination with the second leg converts AC power to DC power or visa-versa.

20. The converter of claim 19, wherein the first energy source comprises a capacitive member.

21. The converter of claim 19, wherein a separate energy source is connected between each high switch and ground.

22. The converter of claim 19, wherein:
the converter includes only one bridge circuit, the bridge circuit being the only one bridge circuit; and
the first energy source is, in totality, a capacitor.

23. The converter of claim 19, wherein the converter is part of an LCL tuned system.

24. The converter of claim 19, wherein:
wherein the first leg in combination with the second leg converts AC power to DC power.

25. The converter of claim 19, wherein:
wherein the first leg in combination with the second leg converts DC power to AC power.

* * * * *